(12) United States Patent
Martin et al.

(10) Patent No.: US 9,098,326 B1
(45) Date of Patent: Aug. 4, 2015

(54) EVOLVING PARALLEL SYSTEM TO AUTOMATICALLY IMPROVE THE PERFORMANCE OF MULTIPLE CONCURRENT TASKS ON LARGE DATASETS

(71) Applicant: BigML, Inc., Corvallis, OR (US)

(72) Inventors: Francisco J. Martin, Corvallis, OR (US); Adam Ashenfelter, Corvallis, OR (US); J. Justin Donaldson, Corvallis, OR (US); Jos Verwoerd, Corvallis, OR (US); Jose Antonio Ortega, Corvallis, OR (US); Charles Parker, Corvallis, OR (US)

(73) Assignee: BigML, Inc., Corvallis, OR (US)

( * ) Notice: Subject to any disclaimer, the term of this patent is extended or adjusted under 35 U.S.C. 154(b) by 358 days.

(21) Appl. No.: 13/673,502

(22) Filed: Nov. 9, 2012

Related U.S. Application Data

(60) Provisional application No. 61/557,826, filed on Nov. 9, 2011, provisional application No. 61/557,539, filed on Nov. 9, 2011.

(51) Int. Cl.
*G06F 9/46* (2006.01)
*G06F 9/50* (2006.01)

(52) U.S. Cl.
CPC .... *G06F 9/46* (2013.01); *G06F 9/50* (2013.01)

(58) Field of Classification Search
None
See application file for complete search history.

(56) References Cited

U.S. PATENT DOCUMENTS

| | | | |
|---|---|---|---|
| 6,278,464 B1 | 8/2001 | Kohavi | |
| 6,301,579 B1 | 10/2001 | Becker | |
| 6,519,599 B1 | 2/2003 | Chickering et al. | |
| 7,386,835 B1 * | 6/2008 | Desai et al. | 717/117 |
| 2001/0054032 A1 * | 12/2001 | Goldman et al. | 706/12 |
| 2005/0097070 A1 | 5/2005 | Enis et al. | |
| 2007/0094060 A1 * | 4/2007 | Apps et al. | 705/7 |
| 2007/0179966 A1 | 8/2007 | Li et al. | |
| 2008/0168011 A1 | 7/2008 | Steinberg | |
| 2009/0064053 A1 | 3/2009 | Crawford et al. | |

OTHER PUBLICATIONS

Haim et al. "A Streaming Parallel Decision Tree Algorithm," Journal of Machine Learning Research 11 (2010) 849-872, Feb. 2010.
Daniel D. Corkill, "Blackboard Systems," AI Expert 6(9): 40-47, Sep. 1991.

(Continued)

*Primary Examiner* — Kenneth Tang
(74) *Attorney, Agent, or Firm* — Stolowitz Ford Cowger LLP

(57) ABSTRACT

We describe a high-level computational framework especially well suited to parallel operations on large datasets. In a system in accordance with this framework, there is at least one, and generally several, instances of an architecture deployment as further described. We use the term "architecture deployment" herein to mean a cooperating group of processes together with the hardware on which the processes are executed. This is not to imply a one-to-one association of any process to particular hardware. To the contrary, as detailed below, an architecture deployment may dynamically spawn another deployment as appropriate, including provisioning needed hardware. The active architecture deployments together form a system that dynamically processes jobs requested by a user-customer, in accordance with customer's monetary budget and other criteria, in a robust and automatically scalable environment.

20 Claims, 33 Drawing Sheets

(56) References Cited

OTHER PUBLICATIONS

Panda et al. "PLANET: Massively Parallel Learning of Tree Ensembles with MapReduce," Proceedings of the 35th International Conference on Very Large Data Bases (VLDB-2009).

Ned Horning: "Introduction to decision trees and random forests", Mar. 19, 2011, pp. 1-14, (http://ebookbrowse.com/decisiontrees-randomforest-v2-pdf-d82430890 [retrieved on Feb. 13, 2013] pp. 2, 3, 7.

Stef Van Den Elzen et al: "BaobabView: Interactive contruction and analysis fo decision trees", Visual Analytics Science and Tehcnology (VAST)__, 2011 IEEE Conferecne on, IEEE, Oct. 23, 2011, pp. 151-160.

J.R. Quinlan: "Simplifying decision trees", International Journal of Man-Machine Studies, vol. 27, No. 3, Sep. 1987.

Tyree et al: "Parallel Boosted Regression Trees for Web Search Ranking", WWW 2011, Mar. 28-Apr. 1, 2011, Hyderabad, India, pp. 387-396.

International Search Report for PCT/US12/063300; Mailing date Mar. 8, 2013.

Stolowitz Ford Cowger LLP Listing of Related Cases May 14, 2013.

\* cited by examiner

| | |
|---|---|
| dialect | {u'lineterminator': u'\r\n', u'skipinitialspace': True, u'quoting': 0, u'delimiter': u',', u'escapechar': None, u'quotechar': u'"', u'doublequote': False} |
| name | school.csv |
| dictionary | /data/upload/pep/5/00000000015.dict |
| header | False |
| treemodel_link | 4e38bc7d03ce890cad000001_school_csv.xml |
| treemodel | /data/upload/pep/5/00000000015.model |
| summary | {u'dictionary': {u'inception': u'2011-08-03T03:17:25Z', u'fields': [{u'datatype': u'string', u'optype': u'categorical', u'name': u'field0', u'missing_tokens': [u'', u'?', u'NULL', u'null', u'nil']}, {u'datatype': u'string', u'optype': u'categorical', u'name': u'field1', u'missing_tokens': [u'', u'NULL', u'missing', u'NIL', u'MISSING', u'?', u'NULL', u'null', u'nil']}, {u'datatype': u'string', u'optype': u'categorical', u'name': u'field2', u'missing_tokens': [u'', u'NULL', u'missing', u'NIL', u'MISSING', u'?', u'NULL', u'null', u'nil']}, {u'datatype': u'string', u'optype': u'categorical', u'name': u'field3', u'missing_tokens': [u'', u'NULL', u'missing', u'NIL', u'MISSING', u'?', u'NULL', u'null', u'nil']}]}, u'summary': {u'count': 11, u'inception': u'2011-08-03T03:17:25Z', u'fields': [{u'name': u'field0', u'categorical_summary': {u'categories': [[u'Deadline?', 1], [u'Near', 4], [u'None', 3], [u'Urgent', 3]]}, u'missing_tokens': []}, {u'name': u'field1', u'categorical_summary': {u'categories': [[u'Is There a Party?', 1], [u'Yes', 5], [u'No', 5]]}, u'missing_tokens': []}, {u'name': u'field2', |

FIGURE 4

| name | status | started | finished | elapsed |
|---|---|---|---|---|
| ML | ● | 2011-08-03 03:17:21.805000 | 2011-08-03 03:17:30.336000 | 0:00:08.531000 |
| web_upload_data | ● | 2011-08-03 03:17:21.805000 | 2011-08-03 03:17:21.956000 | 0:00:00.151000 |
| sniff_csv | ● | 2011-08-03 03:17:22.028000 | 2011-08-03 03:17:23.298000 | 0:00:01.270000 |
| data_avro_gen | ● | 2011-08-03 03:17:22.893000 | 2011-08-03 03:17:26.125000 | 0:00:03.232000 |
| tree_gen | ● | 2011-08-03 03:17:26.241000 | 2011-08-03 03:17:29.270000 | 0:00:03.029000 |
| save_data | ● | 2011-08-03 03:17:22.053000 | 2011-08-03 03:17:22.871000 | 0:00:00.818000 |
| save_data_avro | ● | 2011-08-03 03:17:26.457000 | 2011-08-03 03:17:27.725000 | 0:00:01.268000 |
| save_dictionary | ● | 2011-08-03 03:17:26.403000 | 2011-08-03 03:17:27.855000 | 0:00:01.452000 |
| save_treemodel | ● | 2011-08-03 03:17:29.868000 | 2011-08-03 03:17:30.336000 | 0:00:00.468000 |

Job Id: 4e38bc7d03ce890cad000001

4.2.2. Model creation

4.2.3. Batch prediction

FIG. 23   INITIALIZE GBRT SYSTEM TO SPEED UP PREDICTIONS

| Name | Type | Count | Missing | Errors | Histogram |
|---|---|---|---|---|---|
| Sex | ABC | 500 | 0 | 0 | |
| Age | 123 | 500 | 0 | 0 | |
| Weight | 123 | 500 | 0 | 0 | |
| First Name | ⊕ ABC | 500 | 0 | 0 | |

FIG. 24

Appendix A - Example Tree Model JSON
```
{
  "tree_model":{
    "inception":"2011-06-07T17:42Z",
    "algorithm":"REPTree",
    "missing_strategy":"returnLastPrediction",
    "input_fields":[
    {
      "name":"age",
      "optype":"continuous",
      "datatype":"integer"
    },{
      "name":"sex",
      "optype":"categorical",
      "datatype":"string",
      "missing-tokens":["na", "missing"]
    }],
    "objective_field":{
      "name":"weight",
      "optype":"continuous",
      "datatype":"float"
    },
    "root":{
      "predicate":true,
      "output":62.2,
      "children":[
      {
        "predicate":{
          "field":"age",
          "operator":"lessThan",
          "value":13
        },
        "output":36.2
      },
      {
        "predicate":true,
        "output":52.2,
        "children":[
        {
          "predicate":{
            "field":"sex",
            "operator":"equal",
            "value":"male"
          },
          "output":77.1
        },
        {
          "predicate":true,
          "output":65.7
        }
        ]
      }
      ]
    }
  }
}
```

FIG. 26

Appendix B - Example Results Summary JSON
```
{
    "name":"age",
    "missing_tokens":[["null",15]],
    "numeric_summary":{
    "min":7,
    "max":82,
    "sum":3200,
    "sum_squared":6500,
    "count":85,
    "histogram":[[12.2,12.5],[18.8,10.2],[28.2,15.7],[43,18.1],[58,15.8],[72,10.6]]
    }
},{
    "name":"sex",
    "missing_tokens":[["null",8],["na",6],["missing",6]],
    "categorical_summary":{
    "categories":[["male", 38],["female", 42]]
    }
},{
    "name":"weight",
    "numeric_summary":{
    "min":31.2,
    "max":117.5,
    "sum":12600,
    "sum_squared":193200,
    "count":100,
"histogram":[[39.5,17.2],[45.8,15.9],[67.4,18.6],[78.7,19.3],[93.2,17.1],[102.4,14.6]]
    }
```

FIG. 27

```
{
 "tree_model":{
  "inception":"2011-06-07T17:42Z",
  "algorithm":"REPTree",
  "missing_strategy":"returnLastPrediction",
  "input_fields":[
  {
   "name":"age",
   "optype":"continuous",
   "datatype":"integer"
  },{
   "name":"sex",
   "optype":"categorical",
   "datatype":"string",
   "missing-tokens":["na", "missing"]
  }],
  "objective_field":{
   "name":"weight",
   "optype":"continuous",
   "datatype":"float"
  },
  "root":{
   "predicate":true,
   "output":62.2,
   "children":[
   {
    "predicate":{
     "field":"age",
     "operator":"lessThan",
     "value":13
    },
    "output":36.2
   },
   {
    "predicate":{
     "field":"age",
     "operator":"greaterThan",
     "value":13
    },
    "output":65.7
```

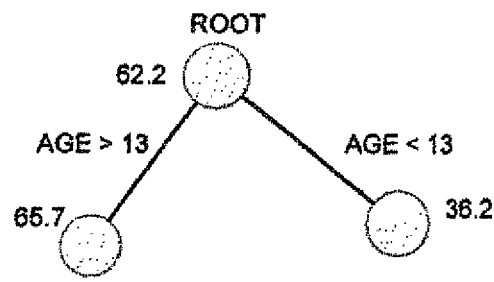

FIG. 28B

FIG. 28A

```
FROM FIG. 10A

"children":[
    {
      "predicate":{
        "field":"sex",
        "operator":"equal",
        "value":"male"
      },
      "output":77.1
    },
    {
      "predicate":{
        "field":"sex",
        "operator":"equal",
        "value":"female"
      },
      "output":52.5
    }
  ]
  }
  ]
  }
  }
}
```

EVOLVING PARALLEL SYSTEM TO AUTOMATICALLY IMPROVE THE PERFORMANCE OF MULTIPLE CONCURRENT TASKS ON LARGE DATASETS

RELATED APPLICATIONS

The present application is a non-provisional of U.S. Provisional Application No. 61/557,826 filed Nov. 9, 2011 and of U.S. provisional application 61/557,539 filed on Nov. 9, 2011 both of which are incorporated herein by this reference.

TECHNICAL FIELD

This invention pertains to computer-implemented methods for an evolving parallel system to automatically improve the performance of multiple concurrent tasks, such as decision tree model building and predictions, conducted on large datasets for multiple customers.

COPYRIGHT NOTICE

© 2011-2012 BigML, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Decision tree learning, used in statistics, data mining and machine learning, uses a decision tree as a predictive model which maps observations about an item to conclusions about the item's target value. More descriptive names for such tree models are classification trees or regression trees. In these tree structures, leaves represent class labels and branches represent conjunctions of features that lead to those class labels.

In machine learning, building a model or decision tree based on a large data set can take a long time. Further, the time and resources necessary to build a model increases as the required quality or depth of the model increases.

In the last few years virtualization has contributed to easily create auto-scaling applications. Most auto-scaling implementations are limited to adding up extra hardware resources and replicate exactly the same software again and again. The structure of the tasks these systems solve are the same on overload conditions. New requests just come at a higher intensity so more resources are added momentarily until the load goes back to normal and then additional resources are disabled.

The criteria used to auto-scale in the past are mostly concerned with hardware monitoring parameters like CPU utilization, band width consumption, free memory, or using metrics computed using the number of requests that are being received or pending to answer.

SUMMARY OF PREFERRED EMBODIMENTS

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present disclosed technology will make it easy and fast for customers to input data to form datasets, create models of their datasets, and generate predictions based on those models, utilizing a robust, scalable architecture that will comply with customer monetary budgets and other selectable criteria, and automatically optimize performance across jobs and customers.

Our system in a preferred embodiment uses additional criteria to improve the overall performance of a computational system in an autonomous way, taking into consideration economic performance (business goals, cost of additional infrastructure, budget etc) and quality of service.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Note that the invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Decision tree learning, used in statistics, data mining and machine learning, uses a decision tree as a predictive model which maps observations about an item to conclusions about the item's target value. More descriptive names for such tree models are classification trees or regression trees. In these tree structures, leaves represent class labels and branches represent conjunctions of features that lead to those class labels.

In machine learning, building a model or decision tree based on a large data set can take a long time. Further, the time and resources necessary to build a model increases as the required quality or depth of the model increases. Approximate histograms have been used in building decision trees. An approximate histogram was introduced by Messrs. Ben-Haim and Yom-Tov, "*A Streaming Parallel Decision Tree Algorithm*" (J. Machine Learning Research 11 (2010) 849-872). The histogram is built in a streaming fashion and acts as a memory-constrained approximation (or compression) of the entire dataset.

Tyree, et al. extend the histogram so that it approximates the relationship between two numeric fields. (WWW 2011—Session: Ranking, Mar. 28-Apr. 1, 2011, Hyderabad, India at 387.) Of course, a "brute force" approach of applying ever increasing resources to the problem, using known parallel and distributed processing techniques, can be useful. Still, the need remains for more effective methods to build decision trees quickly, and to better support classification problems.

Additional aspects and advantages of this invention will be apparent from the following detailed description of preferred embodiments, which proceeds with reference to the accompanying drawings. The invention is not intended to be limited by the drawings. Rather, the drawings merely illustrate examples of some embodiments of some aspects of this disclosure.

BRIEF DESCRIPTION OF THE DRAWINGS

FIG. 2 is a sample screen display showing a series of processes of a job and their dependencies in a GAANT chart representation.

FIG. 3 is a sample screen display of a dataset summary of the type generated by a process executing a data input/analysis task.

FIG. 4 is a sample screen display showing a history record for a job performed by the processes shown in FIG. 2.

FIG. 24 is a simple example of a graphical user interface display of a dataset summary to help users visualize the fields.

FIG. 26 is an example of a decision tree model expressed in a compact JSON format.

FIG. 27 an example of a prediction results summary expressed in a JSON format.

FIG. 28A is another simple example of a decision tree model expressed in a compact JSON format.

FIG. 28B is a decision tree diagram corresponding to the code of FIG. 28A.

DETAILED DESCRIPTION OF PREFERRED EMBODIMENTS

We describe a high-level computational framework especially well suited to parallel operations on large datasets. In a system in accordance with this framework, there is at least one, and generally several, instances of an architecture deployment as further described. We use the term "architecture deployment" herein to mean a cooperating group of processes together with the hardware on which the processes are executed. This is not to imply a one-to-one association of any process to particular hardware. To the contrary, as detailed below, an architecture deployment may dynamically spawn another deployment as appropriate, including provisioning needed hardware. The active architecture deployments together form a system that dynamically processes jobs requested by a user-customer, in accordance with customer's monetary budget and other criteria, in a robust and automatically scalable environment.

Figure 1A:
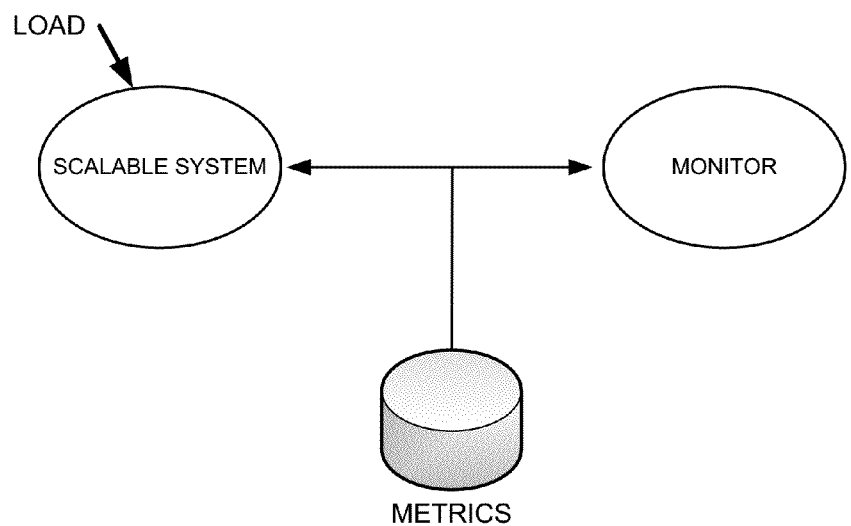
FIG. 1A is a simplified diagram illustrating a prior art scalable system that scales in response to monitoring loading on the system.
Figure 1B:
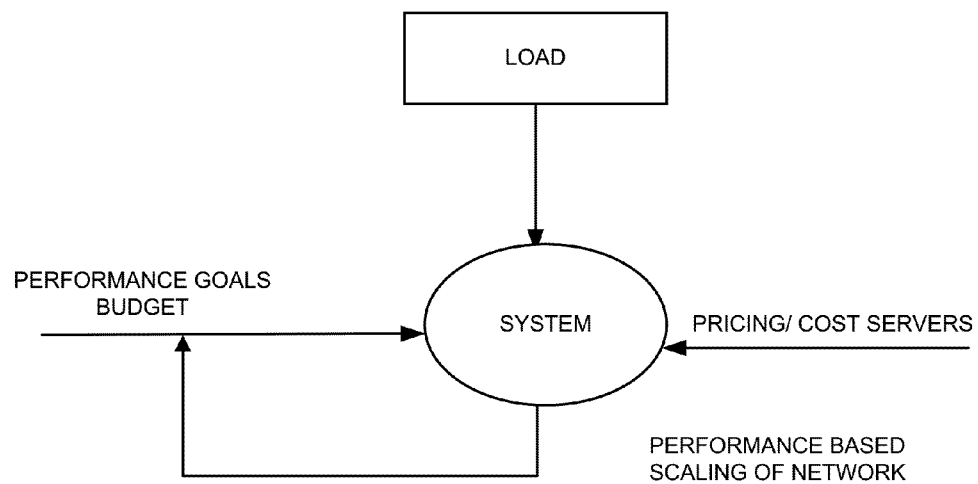
FIG. 1B is a simplified conceptual diagram illustrating a scalable system in accordance with an embodiment of the present disclosure.

Referring now to the drawings, FIG. 1A is a simplified diagram illustrating a prior art scalable system that scales in response to monitoring loading on the system, as mentioned in the background. FIG. 1B is a simplified conceptual diagram illustrating a scalable system in accordance with an embodiment of the present disclosure. Here, the system includes performance goals and customer budget as inputs to consider in operating and scaling the system. Additionally, in a preferred embodiment, the current pricing/costs of additional computing resources also may be taken into account. Resources may include processors, computers, systems, memory, I/O bandwidth, etc. In some cases, computing resources may be provisioned from one or more cloud vendors as further discussed later. The "Load" input to the system typically comprises one or more job requests from users or customers (we use the terms interchangeably). Examples of various job requests are described in more detail below. In general, a job may comprise any request from a user for a response.

Figure 7:
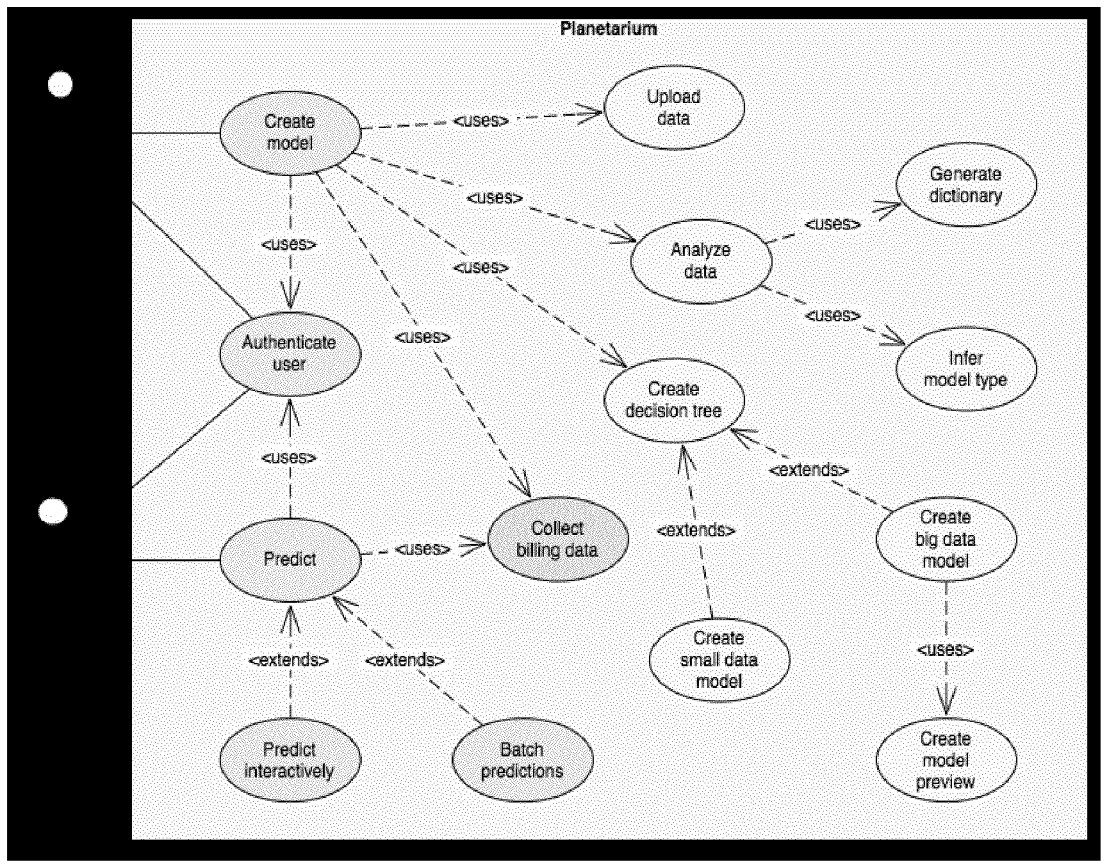
FIG. 7 is a diagram showing some of the main use cases in a system of the type illustrated in FIG. 1B.

FIG. 7 is a diagram showing some of the main use cases in a system of the type illustrated in FIG. 1B. Here, a "model creator" refers to a user who inputs a model creation request (after authentication). To that end, the user needs to upload training data, which first gets analyzed to infer its format, the data dictionary and to decide on the best strategy to create a prediction model. For example, an-memory tree. For small enough datasets, a simple, non-distributed decision tree creator can be launched. Or, a big data model creation may be used for a larger dataset. In the general case, creation of the model will involve the use of multiple computers across one or more datacenters. A preview model using a sample of the data may also be generated (and probably discarded once the final model is computed).

FIG. 3 is a sample screen display of a dataset summary of the type generated by a process that conducts this preliminary analysis. Given the results of this preliminary analysis, input data can be converted into a dataset.

Another user (in FIG. 7), called a "Prediction User" seeks obtain a prediction, based on a specified (or input) dataset and corresponding model. Once a decision tree or model has been created from a given data set, users can access it to make predictions, either interactively or submitting batch queries. As is the case with model creation, this activity can be performed via, for example, a webapp or a RESTful API, both of them accessible only after proper authentication. Preferably accounting is also provided to collect revenue from customers for these services.

Figure 5:
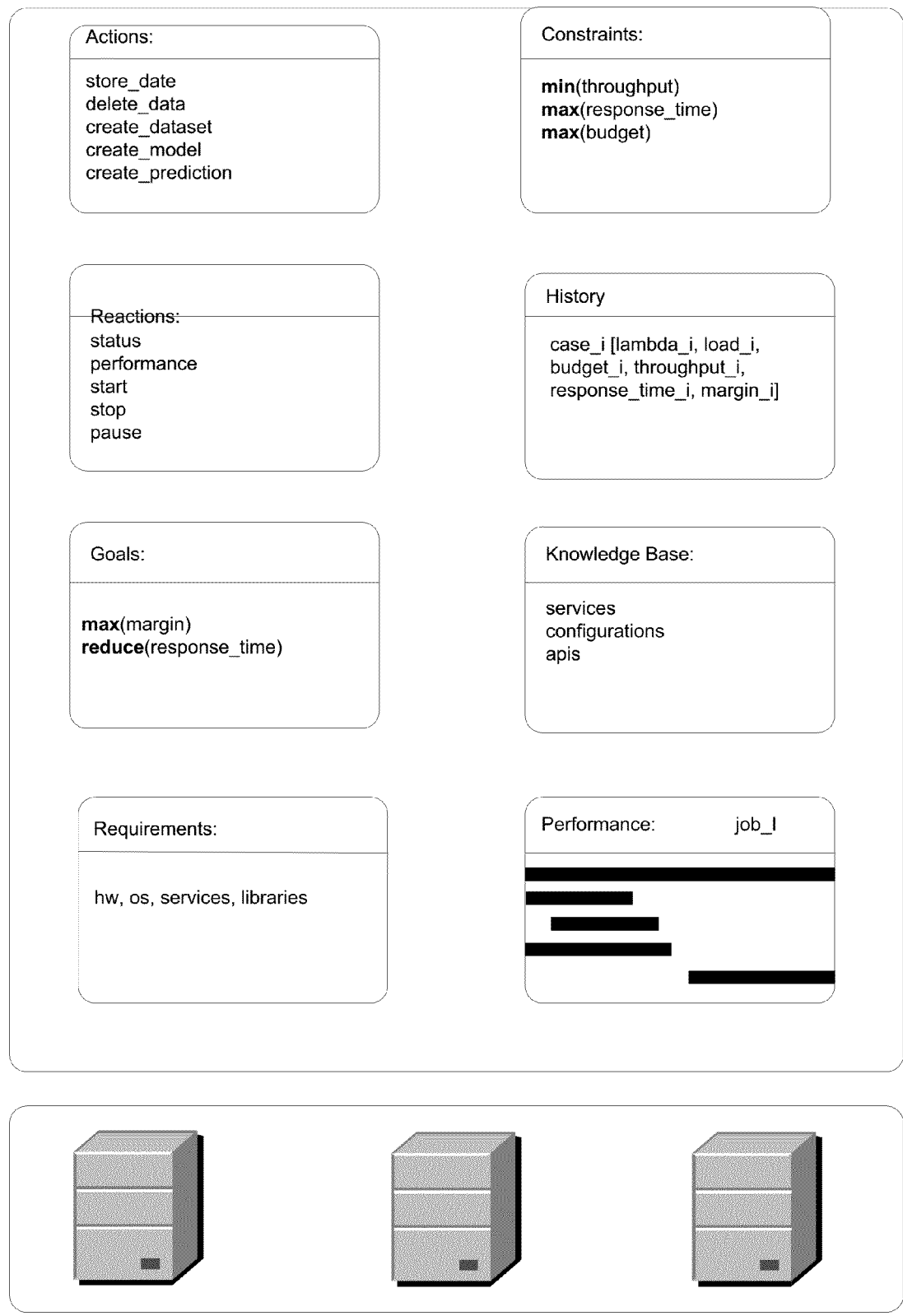
FIG. 5 is a simplified graphical representation of an architecture deployment instance in accordance with an embodiment of the present disclosure, including software processes and allocated hardware resources.

In a system in accordance with the overall architecture disclosed herein, there is at least one, and generally several, instances of an architecture deployment running at any one time. We use the term "architecture deployment" herein to mean a cooperating group of processes together with the hardware on which the processes are executed. Preferably, each architecture deployment is implemented as a set of very loosely coupled processes, distributed and communicating via a blackboard collecting pending tasks. FIG. 5 is a simplified graphical representation of an architecture deployment instance in accordance with an embodiment of the present disclosure, including software processes and allocated hardware resources. In some of the drawings, further described below, we have assigned planet names to each type of process, in an analogy to a "planetarium" or solar system, in which various processes "orbit" around one or more supervisor processes. A supervisor may implement a central blackboard. In other embodiments, some individual processes may maintain their own blackboards, as alternative to, or in addition to a central blackboard.

Typically, we expect to have many instances of a given planet (type of process) up and running at any given moment. The blackboard may act as a repository of pending tasks, where planets can find open problems to solve that fit their capabilities. Every planet kind (again, every process type) behaves as a specialized agent solving a particular (and, usually, quite narrowly defined) kind of problem, and can work in an autonomous way.

In that way, each planet is immediately replaceable in case of failure, and a completion log in the blackboard may be used as a re-synchronization mechanism in case any rollback is needed. Some processes will try to complete as many jobs of a given class as possible, while those serving external users (e.g., file uploaders or model evaluators) will be dedicated to a single task instance as long as needed. In some embodiments, planets in the former group operate in a totally asynchronous manner, driven by requests popping up in the blackboard, while those attending external user requests need to respond synchronously to them. In an alternative arrangement, a central supervisor process may implement logic to direct a user request or a specific task to directly to an appropriate process ("planet").

Figure 8:
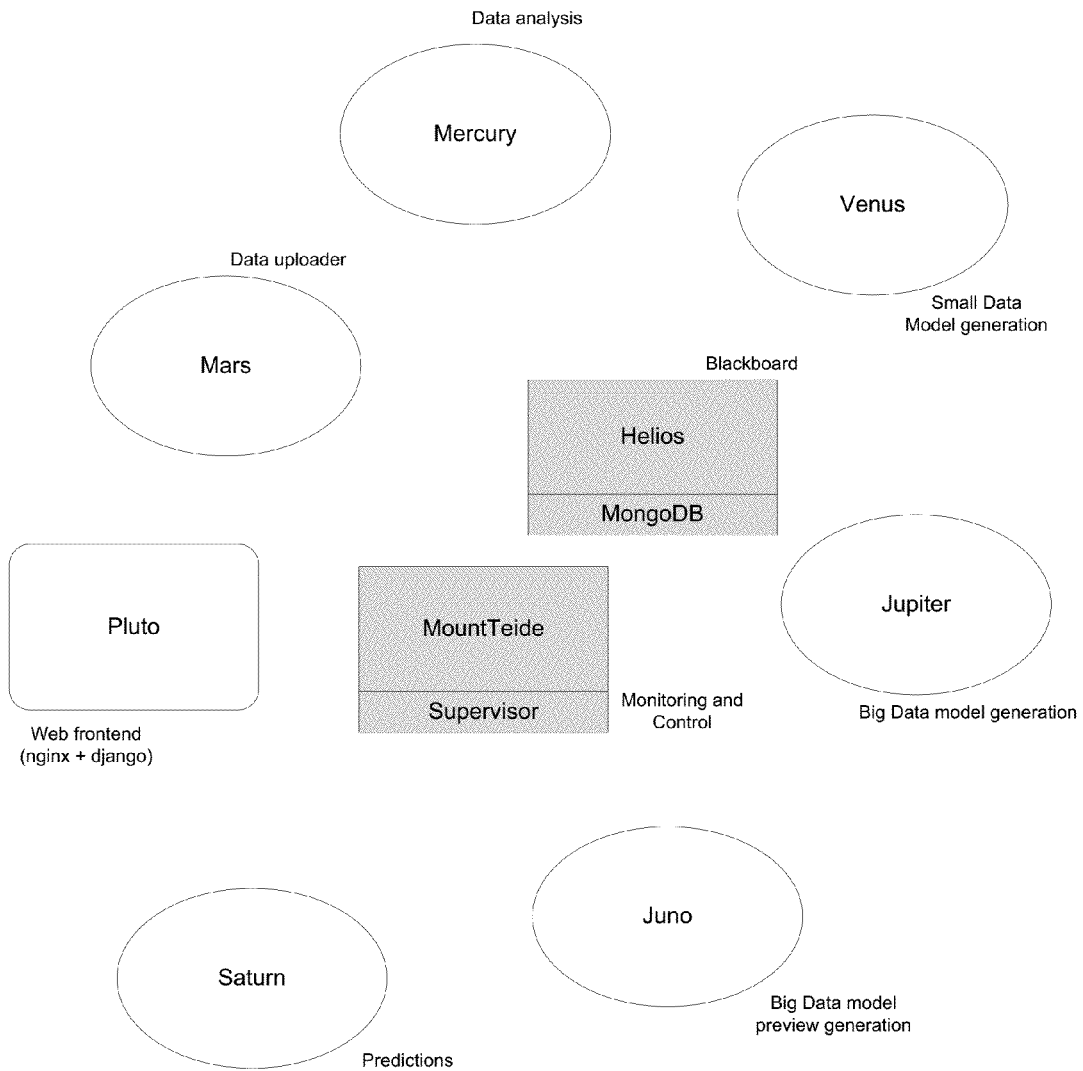
FIG. 8 is a conceptual illustration showing the main processes in an example of an architecture deployment in accordance with an embodiment of the present disclosure.

FIG. 8 is a conceptual illustration showing the main processes in an example of an architecture deployment (a planetarium instance) in accordance with an embodiment of the present disclosure. An instance of the architecture deployment may consist of a blackboard (Helios) orbited by a varying number of planets, supervised by an observatory process (MountTeide) that will allocate new ones as needed (again, in a decentralized manner based on the tasks requests and logs in the blackboard). Despite their heterogeneity, planets preferably share core functionality related to how they behave as components of the planetarium, how they interact with MountTeide, what tasks they perform, what results they yield, etc. Thus, it one may use a planet specification mini-language that is used by an off-line code generator providing skeleton code, on top of which specific process (planet) programs may be written.

Referring again to FIG. 8, we can roughly classify representative processes as three kinds. There may be others:

Persistent services. Helios is the system's blackboard, running on a distributed MongoDB instance. Planet creation, computing resources allocation and system monitoring are performed by MountTeide, which works as the orchestrator of the whole planetarium.

Asynchronous services. These processes are built on top of Tornado, and continuously monitor Helios for new pending tasks they're able to perform. Upon encountering one of them, a task solver thread may be started, and its eventual completion status and output are written back to Helios.

Front-end services. Processes offering a web interface for user interaction, for example built on top of nginx. They're launched on demand by MountTeide, and may initiate synchronous conversations with external users.

In some embodiments, all services record their status periodically in Helios, in the form of heartbeats. That way, they can be monitored by MountTeide. In alternative embodiments, a status query may be sent to each process periodically.

Blackboard Process ("Helios")

In an embodiment, a blackboard may be implemented as a distributed MongoDB instance. It contains not only the lists of pending tasks, but also completion and system logs and accounting records. In some embodiments, Helios may be accessed by every other planet directly, using appropriate language bindings built on top of MongoDB. Data may be stored in GridFS, with pointers in the blackboard. In some embodiments, there is one master blackboard per architecture deployment, with a slave instance for failover. MongoDB provides a failover strategy, since it allows master-slave configurations with the slave taking over (and configuring itself) in case of master's failure. In some embodiments, suggested implementation technologies may include MongoDB, GridFS, access libraries on top of PyMongo.

Supervisor Process

"MountTeide" is the supervisor process coordinating the system and monitoring its health. More concretely, MountTeide:

Monitors Helios' status.

Monitors the system load, allocating new cloud resources as needed and launching the process instances needed for the planetarium's operation.

Monitors the health of launched processes, replacing or reallocating them if need be, via heartbeats written in Helios.

Is itself monitored by a second standby MountTeide process, with which it exchanges direct (RPC) heartbeats.

Thus, in one embodiment, there is one active MountTeide instance per architecture deployment, preferably backed by a failover instance. In some embodiments, suggested implementation technologies may include Python on top of Tornado. Managing processes running on a given node can be accomplished using local Supervisor instances.

In alternative embodiments, since all planets have to query periodically Helios for new messages, one could use the logs of this activity as heartbeats. This technique would reduce database traffic, but, on the other hand, it conflates the two logically independent activities. Planets offer a /status REST API that could be directly used by MountTeide in lieu of the blackboard heartbeats. This would again reduce database traffic, perhaps, at the expense of accountability. In some embodiments, health monitoring may be distributed by instantiating a MountTeide per node. The node instance would use /status to monitor the local planets, and put overall status reports in Helios. A "SuperMountTeide" would then manage global allocation policies.

Data may be stored in GridFS, with pointers in the blackboard. There is one master blackboard per Planetarium system, with a slave instance for failover. MongoDB provides a failover strategy, since it allows master-slave configurations with the slave taking over (and configuring itself) in case of master's failure.

Data Uploader Process ("Mars")

In some embodiments, Mars may be a purely asynchronous planet, reacting to upload file tasks (data_upload_request type messages) appearing in Helios (Pluto being the usual generator of those requests, initiated by an authorized user via Pluto's UI). Upon completing an upload, the data may be stored in the blackboard, for example as a model_raw_data message (usually, to be consumed by a Mercury instance), or a prediction_request_data message (usually, to be consumed by Saturn). The data uploader process Reacts to: data_upload_request. Emits: model_raw_data, prediction_request_data. Of course message names and formats are merely illustrative. In some embodiments, suggested implementation technologies may include: Python on top of Tornado, via a Big Bang planet template.

"Mercury," a Data Analysis Process

In an illustrative embodiment, a data analysis process is provided to react to requests such as model_raw_data messages, analyzing the corresponding data (usually downloaded by "Mars") and serializing it in a binary format apt for the model builder processes. The data analysis may include the following steps:

Format discovery and categorization.

Serialization to a selected format.

Choice of the prediction tree construction algorithm: either in-memory for small data (performed by Venus), or distributed (performed by Jupiter).

In some embodiments, the data analysis results may include data type confirmed, per column, format defined (typing), and summary stats per column, e.g. average, range, standard deviation or the like. These summary statistics may be returned to the user.

A data analysis process preferably Reacts to: model_raw_data or similar tasks. And it Emits a model data, for example: small_model_data, big_model_data. In some embodiments, the resulting model may be conveniently stored in a JSON format.

Suggested implementation technologies for a modeling process may include: Python on top of Tornado, via a Big-Bang planet template, for interaction with the blackboard. Avro library (Java) for serialization. Avro is a known remote procedure call and serialization framework developed within Apache's Hadoop project. It uses JSON for defining data types and protocols, and serializes data in a compact binary format.

Small Model Builder Process ("Venus")

Venus is the name given in the figure to a small decision tree builder process for modeling small datasets. This separate process is optional; a single model builder could be used for all datasets. Upon completion of its job, it registers the model in Helios, ready to be used by the prediction frontend. In this small model builder, decision trees are built on a single computer (preferably the one running the big data model preview process) using standard machine learning libraries. Reacts to: small_model_data. Emits: prediction_model Suggested implementation technologies for this process may include: Python on top of Tornado, via a Big Bang planet template, for interaction with the blackboard. The resulting prediction model may be expressed, for example, in JSON, PMML or any suitable format.

Big Model Builder Process

A large dataset model builder process is provided (named Jupiter in the figure). Importantly, this process orchestrates distributed module building, as further discussed below. Improved model building methods, especially for larger datasets, are described in our commonly-owned application filed concurrently herewith, entitled METHODS FOR BUILDING REGRESSION TREES IN A DISTRIBUTED COMPUTING ENVIRONMENT, application Ser. No. 13/673,064. The contents of that application are incorporated herein and described with reference to FIGS. 19-28. However, the present invention is not limited to using the teachings of that application for model building. Reacts to: big_model_data Emits: prediction_model. As usual, these message names are merely illustrative.

Model Preview and Prediction Processes

In some embodiments, an optional previewer process may be provided, to show a big data model while it is still under construction. (See Juno in FIG. 8.) The application mentioned in the preceding paragraph discusses methods for producing partial results during tree building, and how these previews can be used to generate graphical screen display output. A preview may be updated each time a model is updated. The actual frequency may depend on the size of the dataset. In some embodiments, a model building process may be arranged to report its progress whenever requested, and a separate previewer may be unnecessary.

A predictions process (see Saturn) is used to make predictions once a model is available. This process reacts to messages described as prediction_request_data messages (usually, but not necessarily, emitted by "Mars") combined with the corresponding prediction_model or prediction_model_preview message to generate the corresponding prediction_result. Reacts to: prediction_request_data+prediction_model, prediction_request_data+prediction_model_preview. Emits: prediction_result which may take various forms, depending in part on the type of prediction requested.

In some embodiments, individual interactive predictions may be implemented by various web forms and API functions that are able to make HTTP requests to a predictions process. Prediction results may be encoded, for example, in JSON. JSON (JavaScript Object Notation) is a known lightweight data-interchange format. It is a text-based open standard designed for human-readable data interchange. JSON is suggested here for representing simple data structures and associative arrays, called objects. Despite its relationship to JavaScript, it is language-independent, with parsers available for many languages. Other formats may be used as well consistent with the present disclosure. Further, prediction models may be exported to PMML, Python, and C# code among other things.

Pluto is the name given in the drawing to represent a web frontend for the whole system, configured for receiving user requests and handling synchronous interaction with them. Thus, Pluto won't usually start tasks looking for them in Helios; instead, in will be waiting for task completion messages appearing in there. More concretely, in some embodiments, Pluto:

Manages user authentication and profiles, including billing.

Offers a model creation frontend, initiated by a data upload request.

Offers a prediction frontend, and can offer interfaces for existing models and their previews.

These tasks may be broken down in different web apps accessed from a common frontend. Details of such things are known. Emits: data_upload_request. Reads: prediction_model_preview, prediction_model, prediction_result. Suggested implementation technologies for the web interface may include Django on top of nginx.

In some embodiments, a system of calls, callbacks, and status messages that enable interaction with the front end may be employed. In many cases, asynchronous methods may be used, for example by providing simple (i.e., "Waiting . . . ") responses to queries until the results of the asynchronous request are available.

Figure 9:
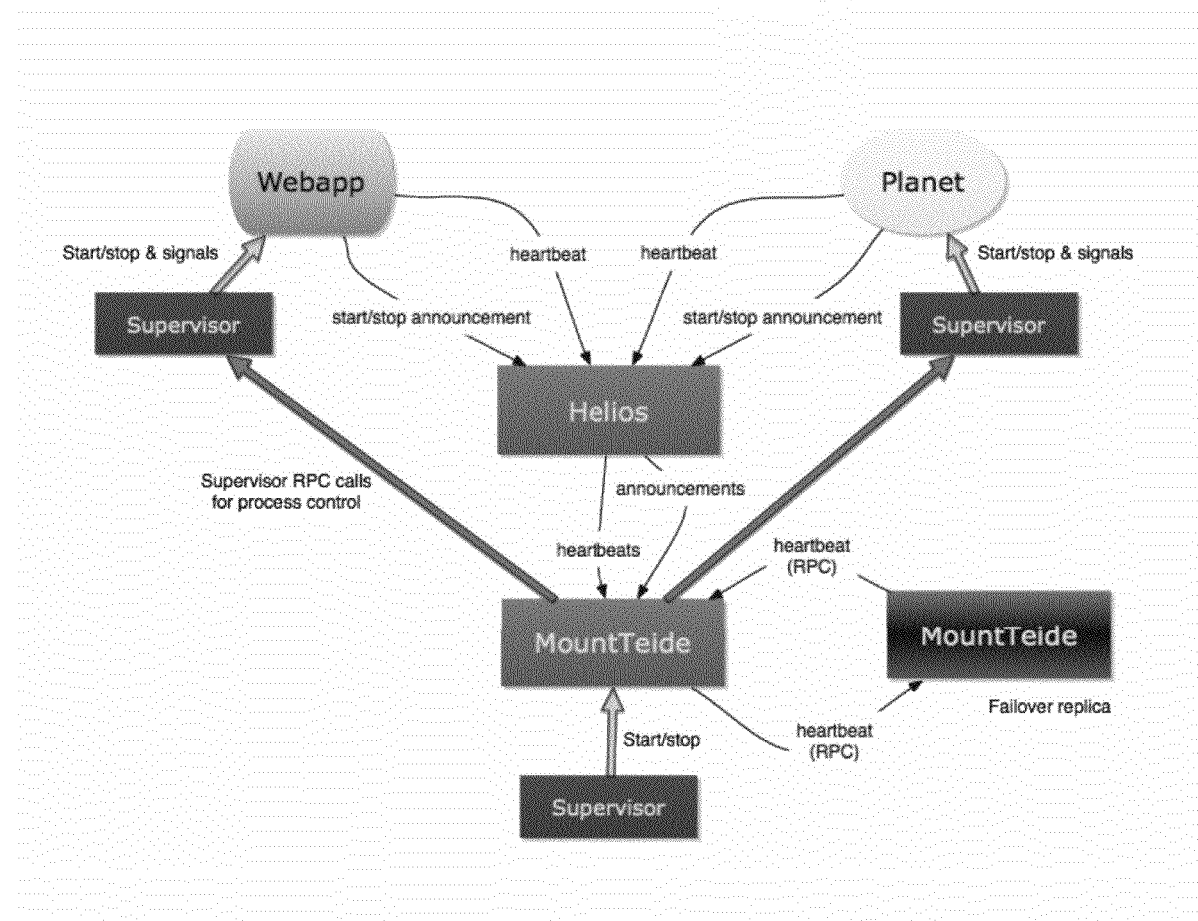
FIG. 9 is a simplified diagram illustrating data and control flow in the architecture deployment of FIG. 8.

FIG. 9 is a simplified diagram illustrating data and control flow in operation of an architecture deployment of the type illustrated in FIG. 8. In the illustrated embodiment, since it implements a mostly asynchronous architecture mediated by a blackboard, data flow largely determines control flow. In some other embodiments, more direct messaging may be used with less reliance on a centralized blackboard. In FIG. 9 it illustrates the monitoring and control activities of a central supervisor process ("MountTeide").

Figure 10:
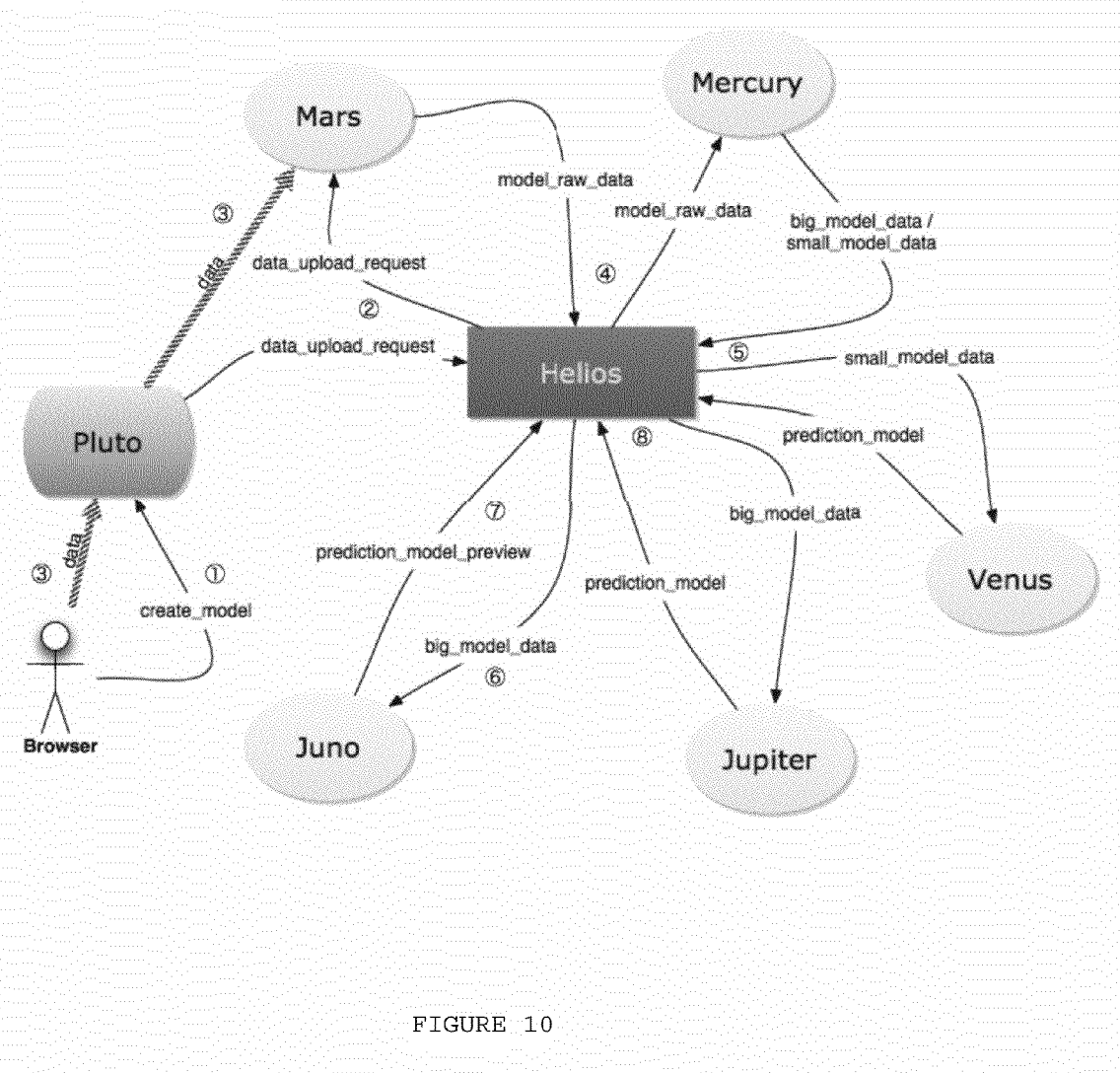
FIG. 10 is a simplified diagram illustrating data and control flow in an example of processing a prediction model creation job in an architecture deployment of the type shown in FIG. 8.

Model creation, in some embodiments, is illustrated in the data and control diagram of FIG. 10. The diagram shows the main points, as follows.

A user communicates with Pluto requesting model creation. Details of authentication are omitted.

The data upload request is put in the blackboard, and Pluto waits synchronously for a Mars instance to accept it.

Pluto bridges direct communication from the user to Mars. Mars's model_raw_data message contains the uploaded data.

Mercury uses the raw input data to create, after its analysis, a big_model_data (alternatively, it could have produced a small_model_data to be handled by Venus).

Jupiter starts working on the distributed tree creation, requesting (if appropriate) a model preview from Juno.

In parallel with Jupiter's work, Juno generates the preview. This model will be eventually replaced by Jupiter's.

While all of the above is happening, Pluto might be waiting synchronously for the appearance of the of the model preview.

When a new high-level job is started, Pluto needs a way to obtain a unique ID to wait on. This may be done by Helios (MongoDB) directly providing it. In other embodiments, MountTeide may be arranged to intervene. Further, appropriate data retention policies should be included. For example, after a dataset is produced for model generation, the original uploaded (raw) data may be deleted, subject to customer policies.

Batch Prediction

Figure 11:
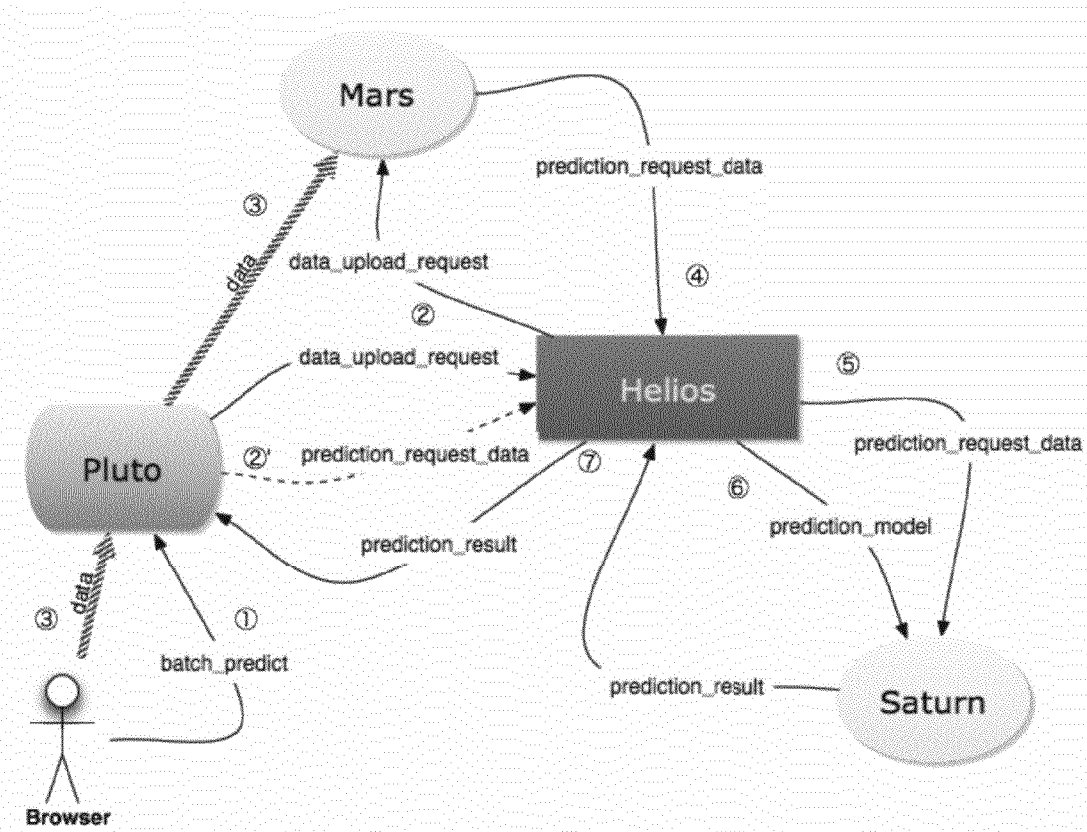
FIG. 11 is a simplified diagram illustrating data and control flow in an example of processing a batch prediction job in an architecture deployment of the type shown in FIG. 8.

FIG. 11 is a simplified diagram illustrating data and control flow in an example of processing a batch prediction job in an architecture deployment of the type shown in FIG. 8.

A user requests using a previously generated model to make predictions on a data file.

Pluto puts a data upload request in the blackboard, and waits for Mars to attend it. Alternatively, for small data uploads, Pluto can generate directly the prediction_request_data message, bypassing Mars.

Pluto bridges direct communication from the user to Mars, and starts waiting for the appearance of a prediction_result in Helios.

The uploaded data is put into Helios by Mars as a prediction_request_data message.

Saturn reacts to the prediction request data, provided an associated model is available.

Saturn retrieves the model and applies it to the incoming data.

The results are stored in Helios, as a prediction_result message, and Saturn can retrieve it.

Figure 12:
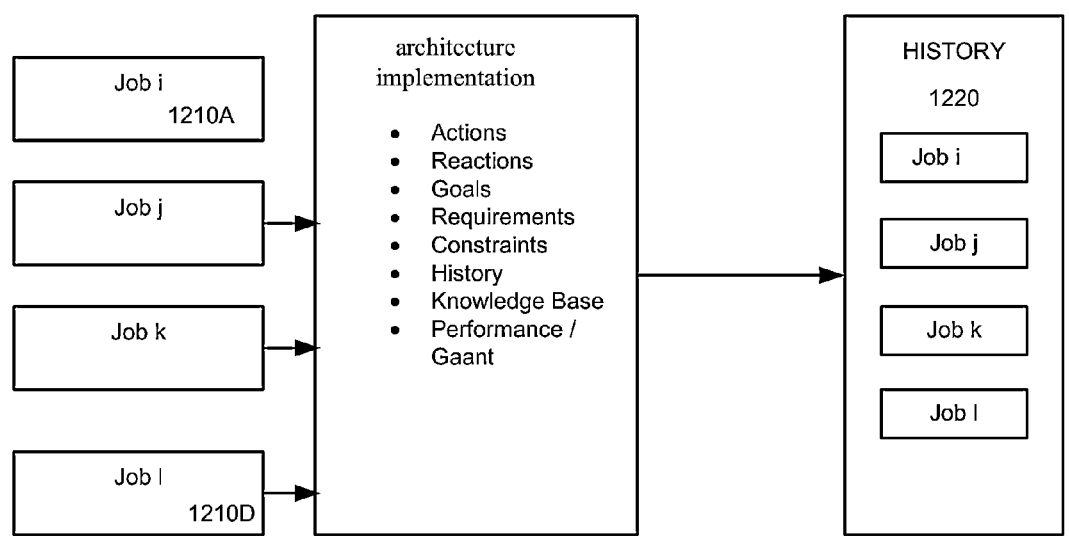
FIG. 12 is a high-level job flow diagram further illustrating operation of a system comprising a plurality of architecture deployment instances.

FIG. 12 is a high-level job flow diagram. Here, various user jobs 1210A-1210D are input to the system described above. The system performs the requested jobs, and accumulates history data of its activities, saved to a history knowledge base 1220.

The inputs to the system may comprise an arbitrary set of requests of arbitrary type, size, priorities, and budgets. Each request belongs to a customer. Each customer can generate an arbitrary number of requests. Each request has associated a budget that is the value of the maximum number of resources that can be spent to compute a response.

In an embodiment, customers have allocated an arbitrary budget that can individually increase or decrease at their own convenience. The arrival rate (lambda) of requests is unknown but the architecture may use historical data to forecast it. Arrival rate forecasts may use overall arrival rate and are also segmented on a individual customer basis and type of requests. Preferably, in operation, the system accumulates data that reflect overall arrival rate (of requests), per-customer arrival rate, overall job size distribution, per-customer job size distribution and per-customer budget. The system monitors these statistics and scales as explained below to maximize satisfaction over all current customers.

In an embodiment, requests are mainly data analysis tasks that require heavy computation on a big dataset that comes with the request, or it is referenced by the request but can also be small tasks like generating a set of predictions based on a previously computed model by another request or generating a status report. Preferably, each request is processed by a job with a unique id. Each job is decomposed in a number of tasks that depend on the type of request. A job is completed once all the tasks that compose it have been finished satisfactory. The number of tasks that compose a job is arbitrary. Tasks can use other tasks' output as input. A task becomes executable only if all the inputs it needs are present. Tasks are executed using the Actions provided by one or more of the architecture deployments.

Preferably, each architecture deployment or implementation deals with a family of requests for a subset of customers. Each architecture implementation comprises or implements:
1. An set of Actions. An action is executed autonomously and asynchronously as soon as a task that requires such action gets all the inputs needed for its execution.
2. A set of Reactions. Reactions are executed upon user's request. A "user" can also be another architecture implementation (instance).
3. A number of Goals that drive the instance behavior. For example, when a situation arises where an autonomous decision needs to be made. Goals help each implementation to point in the right direction.
4. A set of Requirements that collect all the hardware, operating systems, services, libraries and tools that are needed to execute Actions and Reactions.
5. A set of Constraints that define certain parameters under each instance must always operate.
6. A case based History repository 1220 where cases describing previous situations are store together with the performance results achieved. For example, historical data may include resource usage, budget and margin (model quality) information.
7. A Knowledge Base that describe a number of services, configurations and APIs that are available to the implementation as well as the cost associated to each one.
8. An embedded monitor that tracks the execution times and Performance for each action and reaction for all the tasks that are being executed. A Gantt chart like structure preferably is used to easily determine the dependencies and parallelism between tasks. Performance charts for previous jobs also may be stored in the history repository, which may be shared across architecture implementations. Performance data may include per-job performance, per-customer performance and per-action performance.

We now summarize some of the aspects introduced above, with regard to a preferred embodiment, and also introduce additional related aspects, as follows:

(1) We have described a high-level computational framework to optimize the parallelization and performance of cooperative distributed systems, each of which we referred to as an architecture deployment. Each deployment was described as a system of "planets" (processes).

(2) Each architecture deployment instance comprises a set of reactions, a set of actions, a set of constraints, a set of goals, a set of requirements, a case base of past performances, and a knowledge-based to know how to operate on the computational environment.

(3) Each architecture deployment instance is self-aware of the resources consumed both in terms of hardware and in terms of dollars, and also the return it can achieve by accelerating certain tasks or the loses the system can incur if certain goals are not achieved or certain constraints are not respected.

(4) Each architecture deployment instance also may consider Quality of Service as an additional criteria. In certain circumstances a lower quality of output or process will be acceptable to improve on the time and money constraints, while in other circumstances a lower quality is absolutely not acceptable. These may be set and adjusted by each user of the system.

(5) Each architecture deployment instance uses the set of goals and constraints to determine the best strategy for the replication, distribution, duplication, or allocation of the tasks that need to accomplished for each request. These operations are described in more detail shortly, with regard to FIGS. 13-16.

(6) Each architecture deployment instance is capable of reacting to a different number of messages and also proactively start its own actions.

(7) Each architecture deployment instance constantly monitors the degree of parallelization and detects bottlenecks through continuous analysis of the gantt charts generated by the tasks performed by a set of processes (planets) working together.

(8) Each architecture deployment instance can automatically spawn new servers and instantiate each one with a new process that is capable of performing a subset of actions and proactive actions. This is further described below.

(9) Each architecture deployment instance can communicate through a distributed blackboard but other communication mechanisms could be used.

(10) A process is capable of learning from past experiences and improving its efficiency over time.

Figure 2:
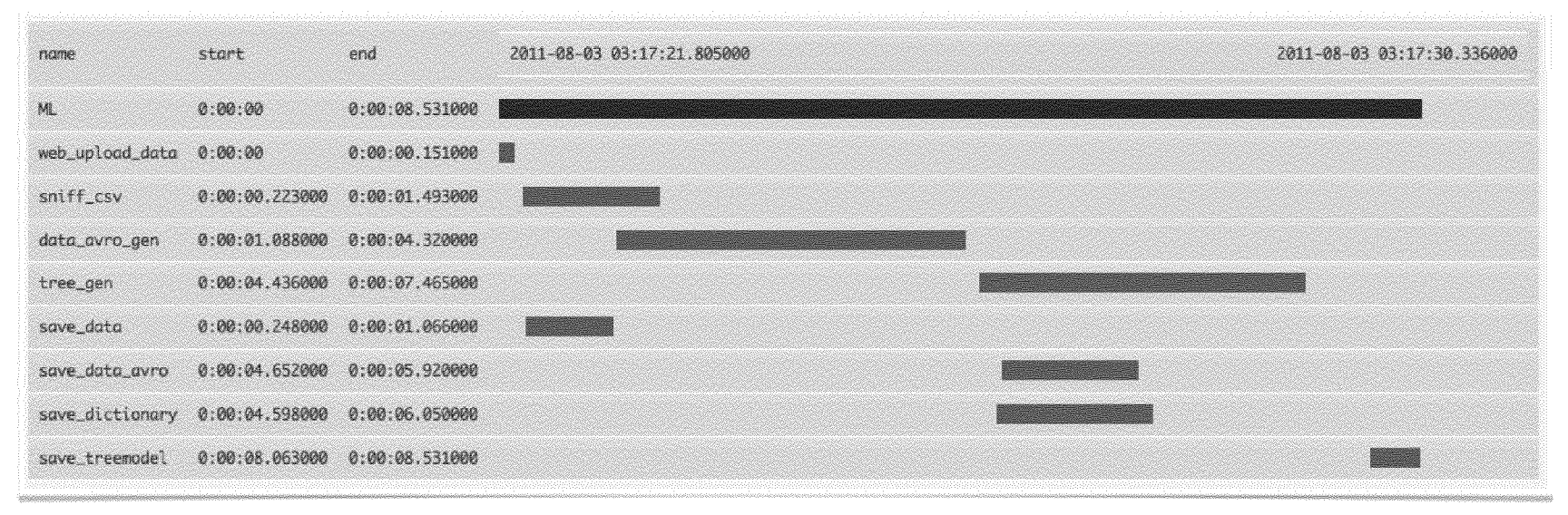

One architecture deployment instance, by way of example, may implement Actions:
sniff_csv, data_avro_gen,
tree_gen, save_data,
save_data_avro, save_dictionary,
And the same instance provides Reaction: web_upload_data which may be sync or asynchronous. FIG. 2 is a sample screen display showing a series of processes conducted by an example deployment instance, and their dependencies in a GAANT chart representation. FIG. 3 is a sample screen display of a dataset summary of the type generated by a process such as "sniff_csv" and or "data_avro_gen". These are examples of processes for inspecting and analyzing input data as discussed earlier. FIG. 4 is a sample screen display showing a history record for a job performed by the processes shown in FIG. 2. Using the above tools and data, each architecture deployment instance (or "PASADA" in some of the drawings) can introspect how long each of the actions or reactions it implements takes in terms of time, computational resources, and economic value. As noted, these may be compared to applicable budgets and other constraints.

Next, we discuss in more detail how a representative system may operate consistent with the present disclosure. Each job (user job or request) can be done by performing a set of tasks. Each task may have an arbitrary number of [key, value] inputs that are required to be in the system before the task can be started. Each task produces a number of [key, value] outputs that might be required by other tasks. Many tasks can be decomposed in smaller sub-tasks that can be distributed to other services.

Some examples of tasks are:
(1) Save input to a separate storage
(2) Compute a summary of a big data file
(3) Compute a model of a big data file
(6) The input is undefined, just restricted to some small formatting rules.
(7) Unrestricted in terms of content and in terms of size.
(8) Although through complexity analysis an upper bound of the time require to perform tasks on the input can be found, the total amount of time to complete a job is not deterministic as it depends on the load and resources allocated.
(9) This means that only one job can collapse the whole system if not properly managed.

Scaling the system in a preferred embodiment may include one or more of the following operations or primitives defined below. An architecture deployment instance combines these four primitives to distribute or replicate actions to improve the performance of the system, based on criteria computed through introspecting the jobs at hand and using historical data to find the best combination of resources for the current situation.

Figure 13A:
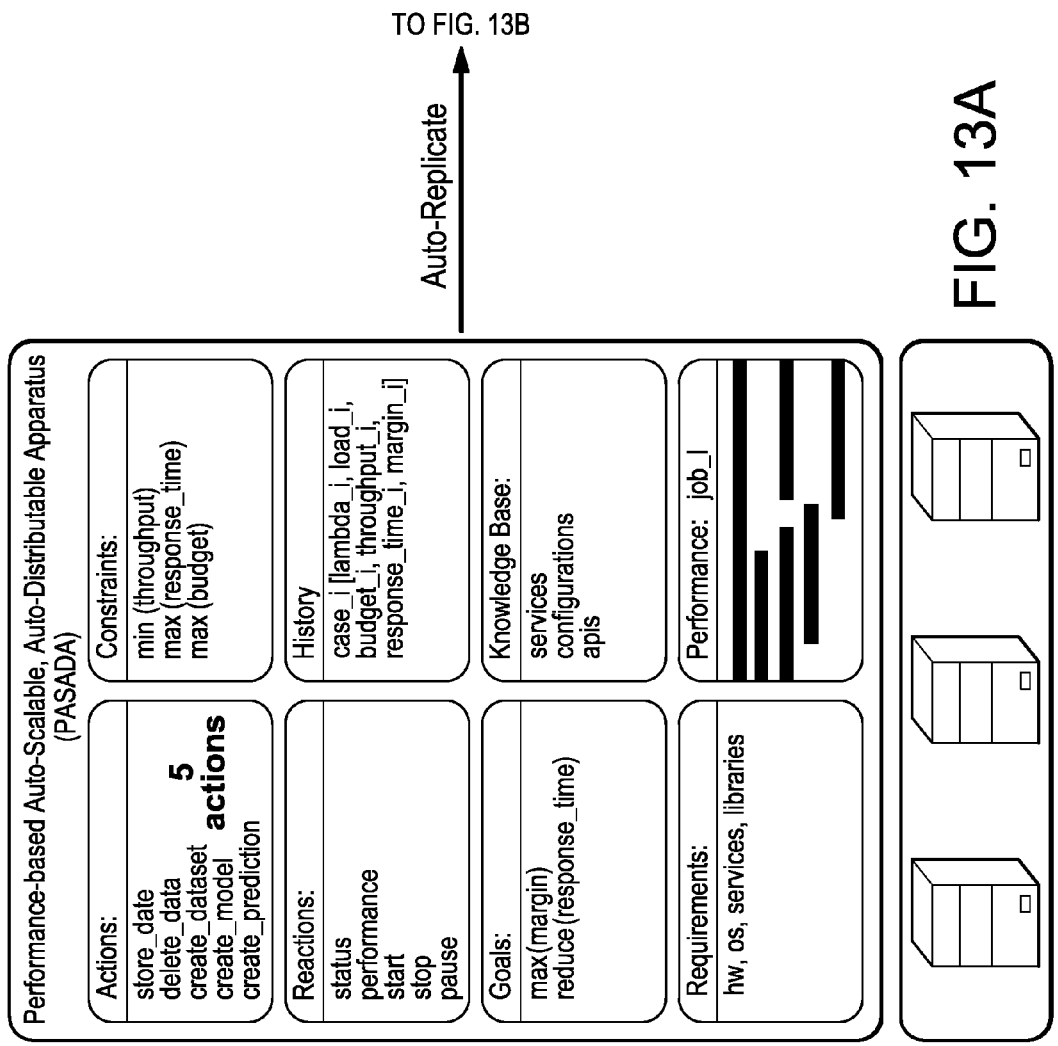
FIG. 13 is a simplified illustration of an auto-replicate operation to improve performance of the system.
Figure 13B:
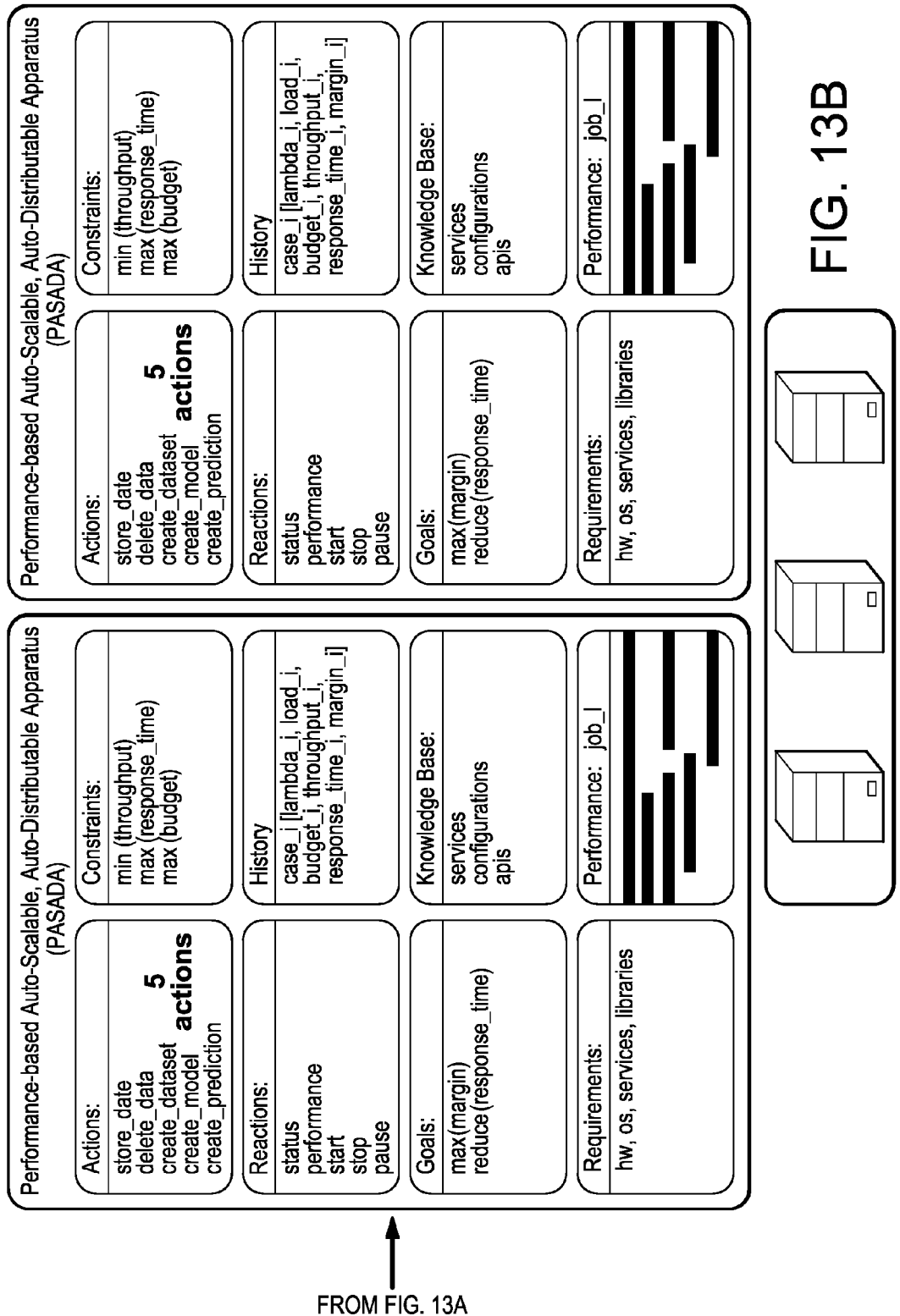

1. Auto-Replicate:
   Actions, Reactions
   Goals, Constraints
   Budget
   REPLICATION_INHERITABLE|DISTRIBUTION_INHERITABLE|
   DUPLICATION_INHERITABLE|ALLOCATION_INHERITABLE
2. Auto-Distribute:
   Action Disjoint Partition, Reaction Partition
   Goals, Constraints
   Budget
   REPLICATION_INHERITABLE|DISTRIBUTION_INHERITABLE|
   DUPLICATION_INHERITABLE|ALLOCATION_INHERITABLE
   Resource Distribution
3. Auto-Duplicate:
   Actions, Reactions
   Goals, Constraints
   Budget
   REPLICATION_INHERITABLE|DISTRIBUTION_INHERITABLE|
   DUPLICATION_INHERITABLE|ALLOCATION_INHERITABLE
4. Auto-Allocate:
   Actions, Reactions
   Goals, Constraints
   Budget
   REPLICATION_INHERITABLE|DISTRIBUTION_INHERITABLE|
   DUPLICATION_INHERITABLE|ALLOCATION_INHERITABLE
   Resource Allocation Auto-Replicate is illustrated in FIG. 13. It replicates the set of actions, reactions, goals, requirements, constraints, history and knowledge base and performance. The resulting two instances may operate on the same hardware resources as before the replication. For example, the whole instance may be duplicated here, except for the central supervisor process. It continues to oversee the whole system. Again, it may keep the same infrastructure as before. In this scenario the hardware may have been under-utilized. After the replication, that same hardware can get more work done (typically at no additional monetary cost).

Figure 6:
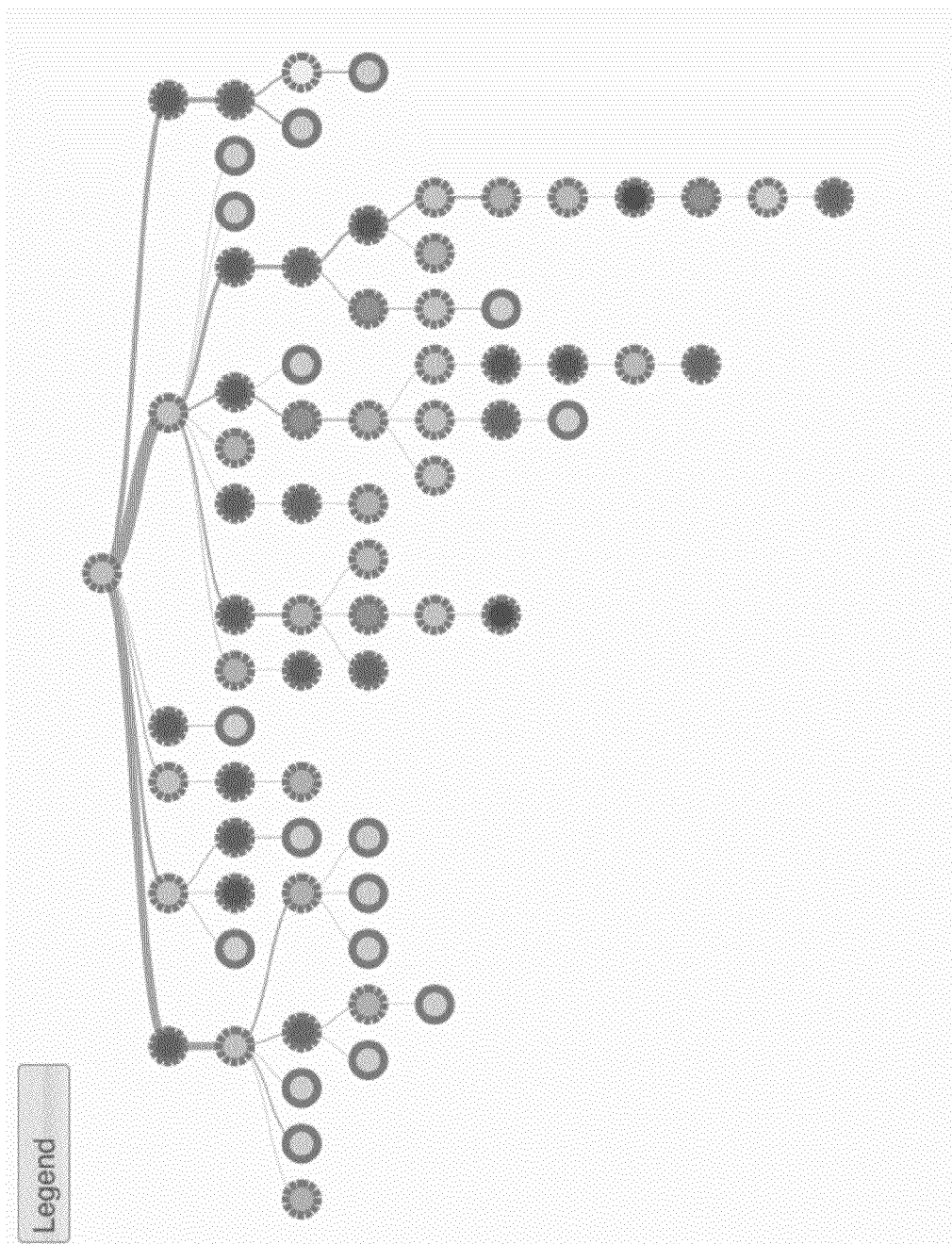
FIG. 6 is an example of a decision tree visualization interface.
Figure 14A:
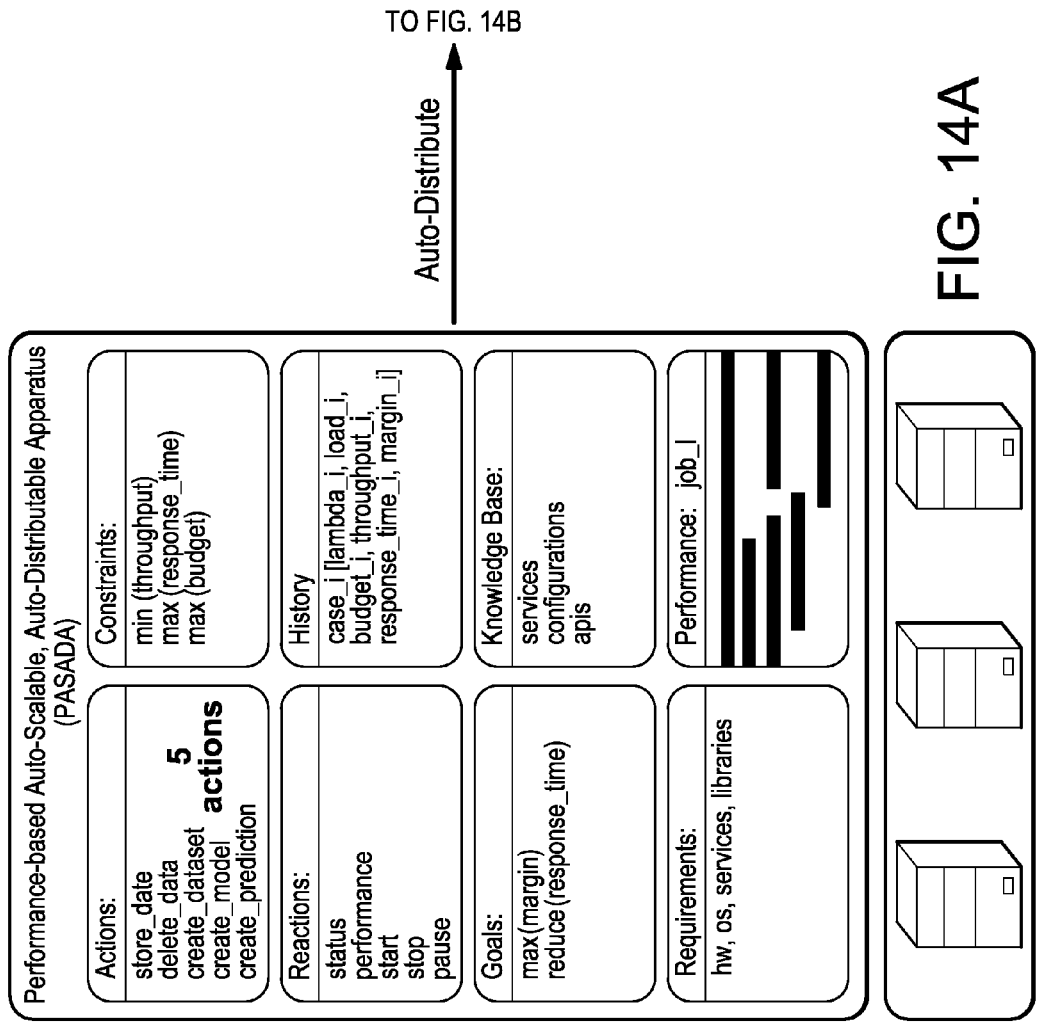
FIG. 14 is a simplified illustration of an auto-distribute operation to improve performance of the system.
Figure 14B:
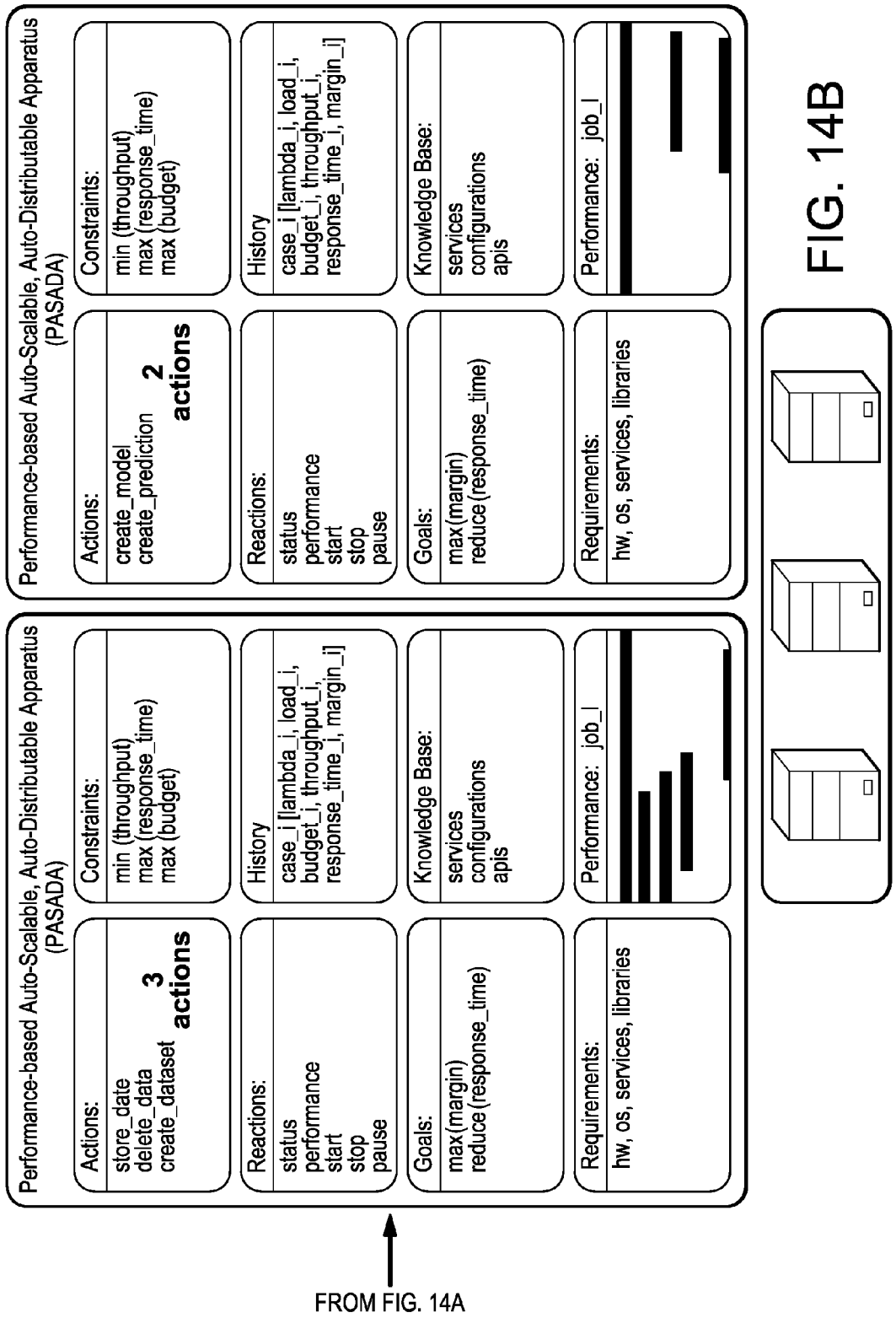
Figure 15A:
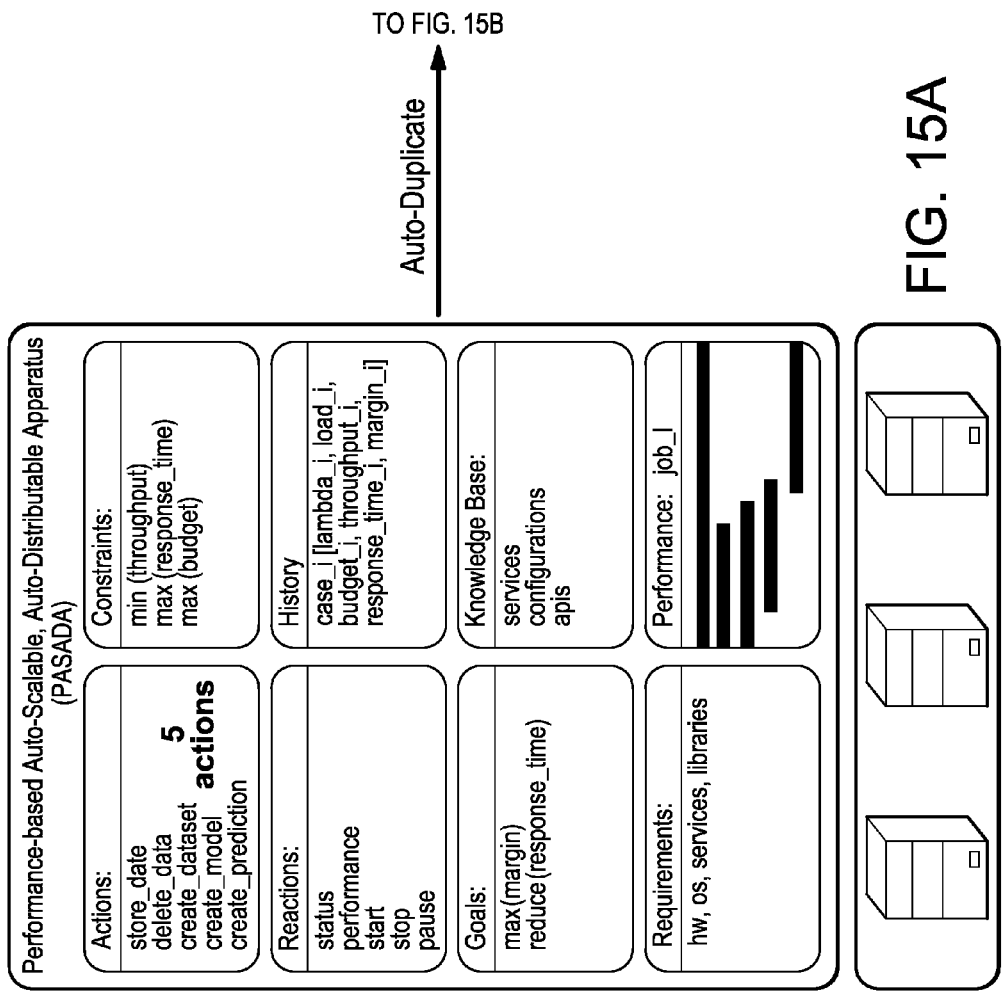
FIG. 15 is a simplified illustration of an auto-duplicate operation to improve performance of the system.
Figure 15B:
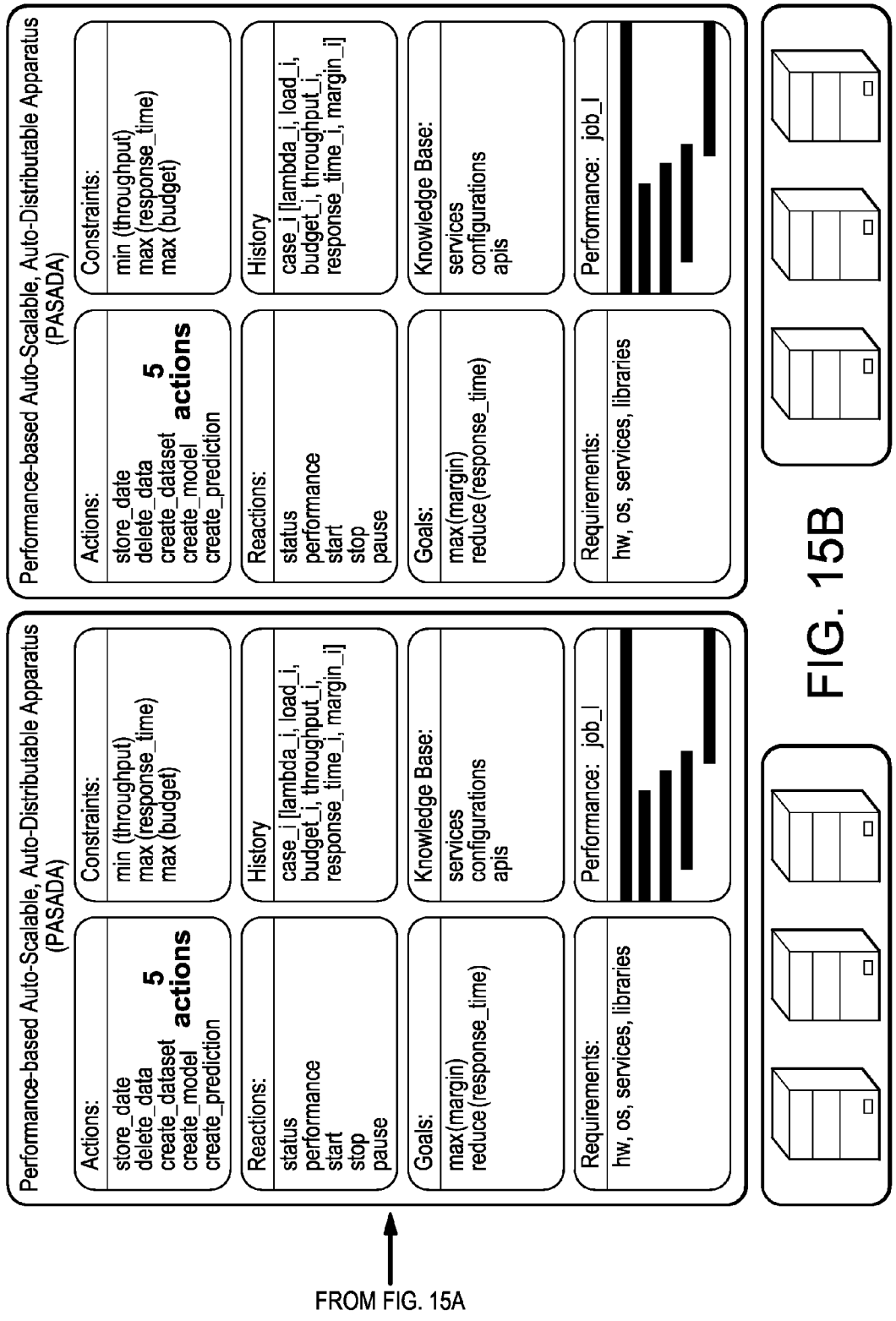
Figure 16A:
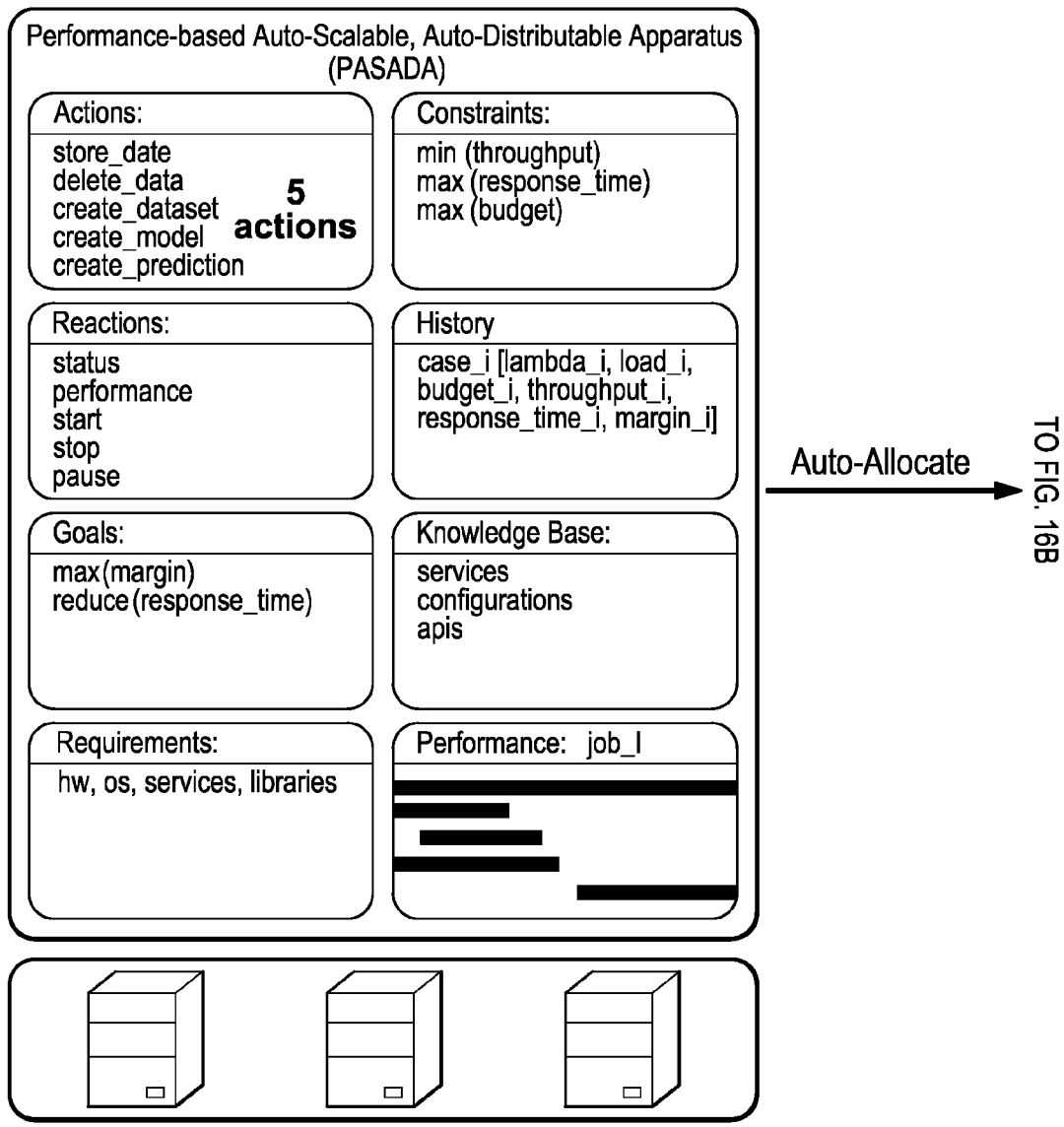
FIG. 16 is a simplified illustration of an auto-allocate operation to improve performance of the system.
Figure 16B:
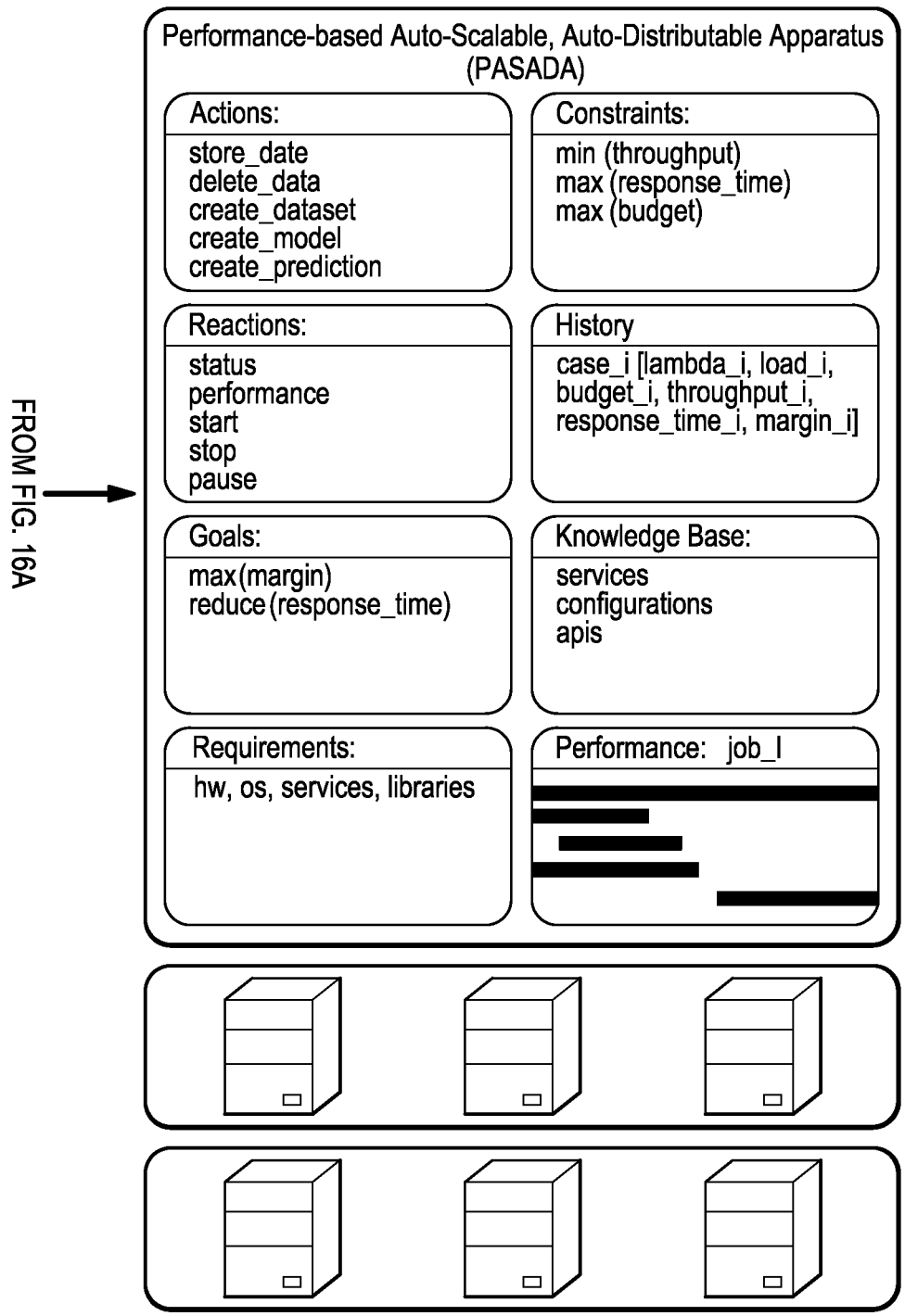

Auto-Distribute is illustrated in FIG. 14; it partitions the actions in two disjoint sets. For example, the drawing shows five actions to be processed. These get distributed; three actions to one "child" and two actions to the other instance in this example. For example, suppose one customer does not require predictions at this time, but is merely inspecting visualizations. (FIG. 6 is an example of a decision tree visualization interface.) Another customer may need intensive model building. A copy of the architecture instance is created that may be optimized for the actions required.

Auto-Duplicate: Duplicates the infrastructure and replicates all the actions; see FIG. 15. For example, if the current hardware is "pegged"-operating at maximum throughput, say with little or no remaining free memory, then the instance is duplicated, and new resources brought to bear.

Auto-Allocate: Increases the infrastructure; see FIG. 16. For example, the system might replicate a database server (a process) where more traffic or "hits" to the database must be accommodated to meet performance goals. In this case, the process is duplicated to more machines, along with copies of the database.

Figure 17:
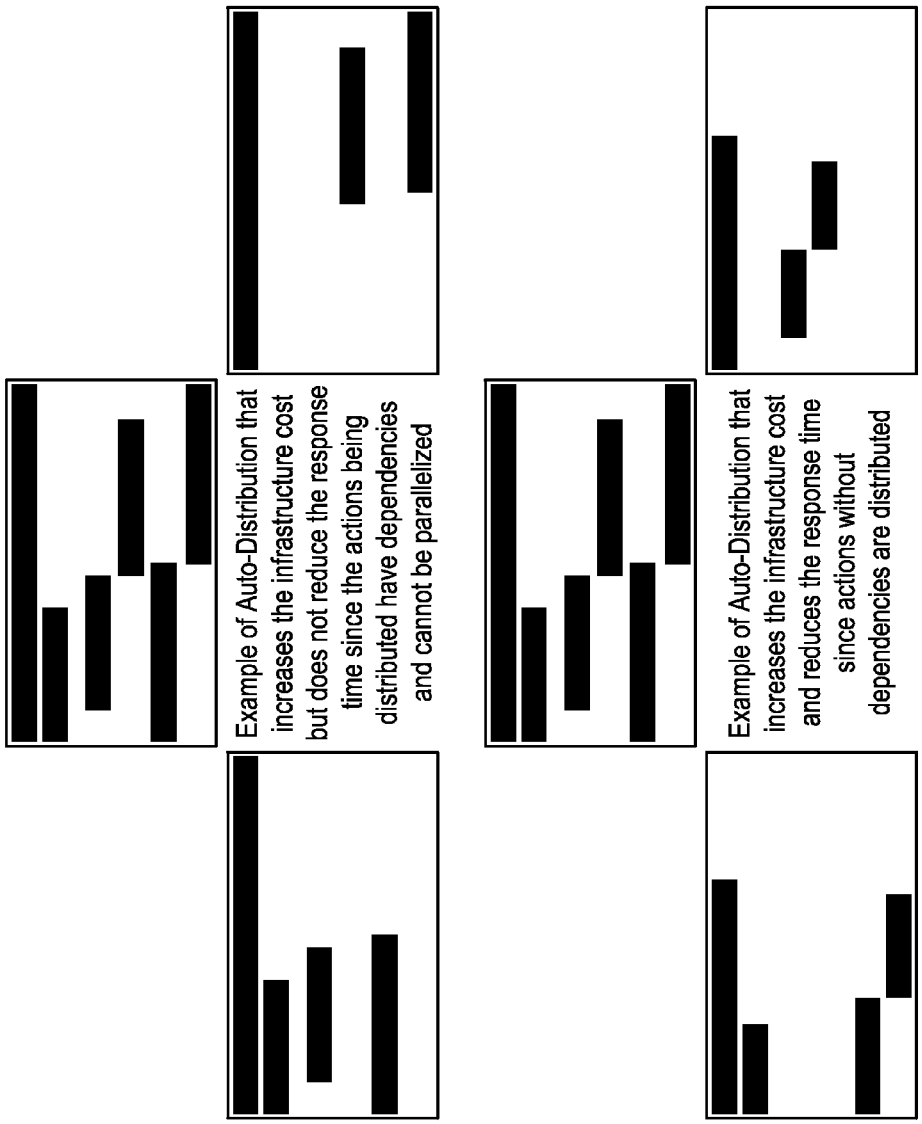
FIG. 17 is a series of GAANT chart representations of actions showing examples of auto-distribution of selected actions.
Figure 18A:
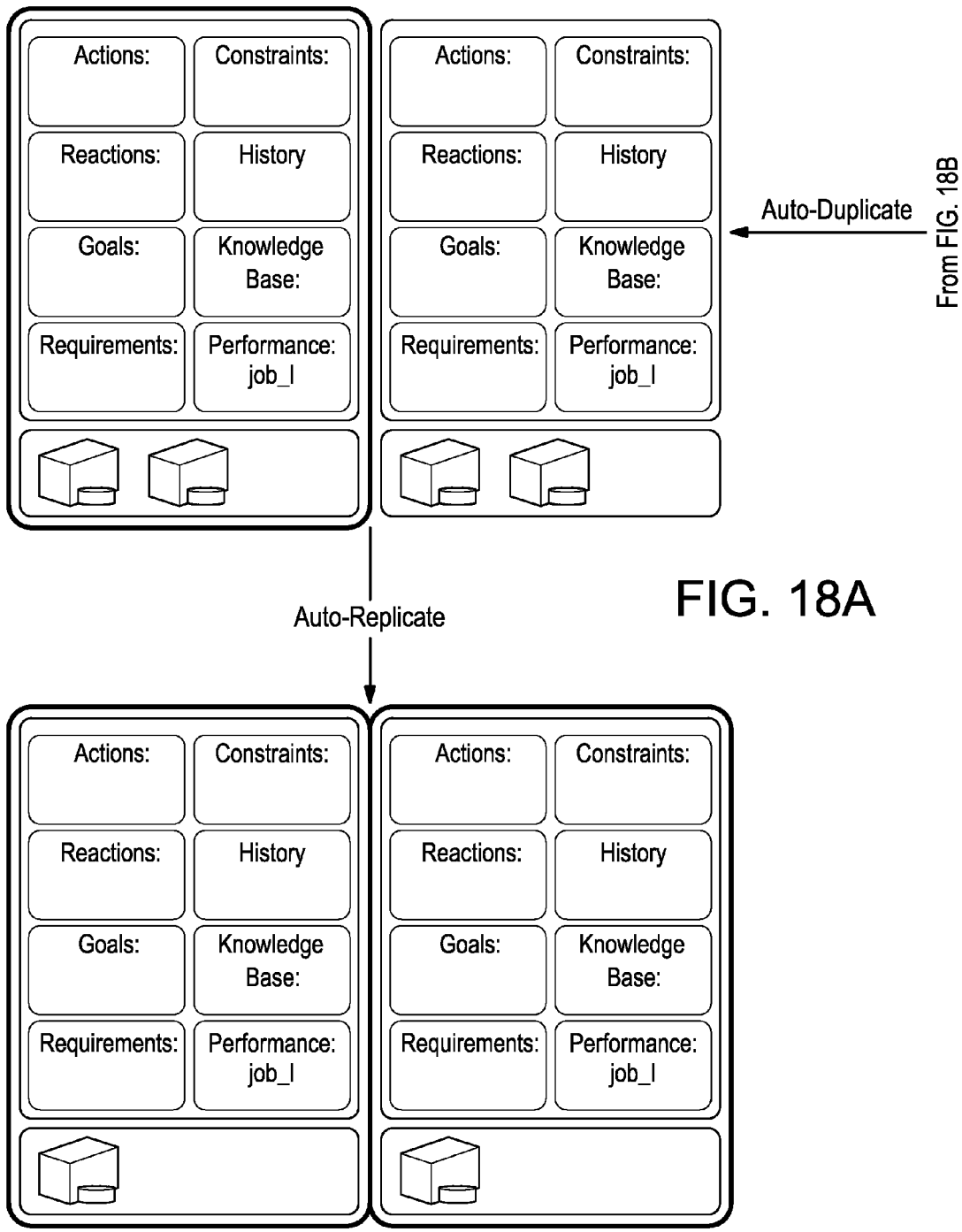
FIG. 18 illustrates a system utilizing auto-distribute, -duplicate, -replicate and -allocate primitives in an evolving parallel system consistent with an embodiment of the present invention.
Figure 18B:
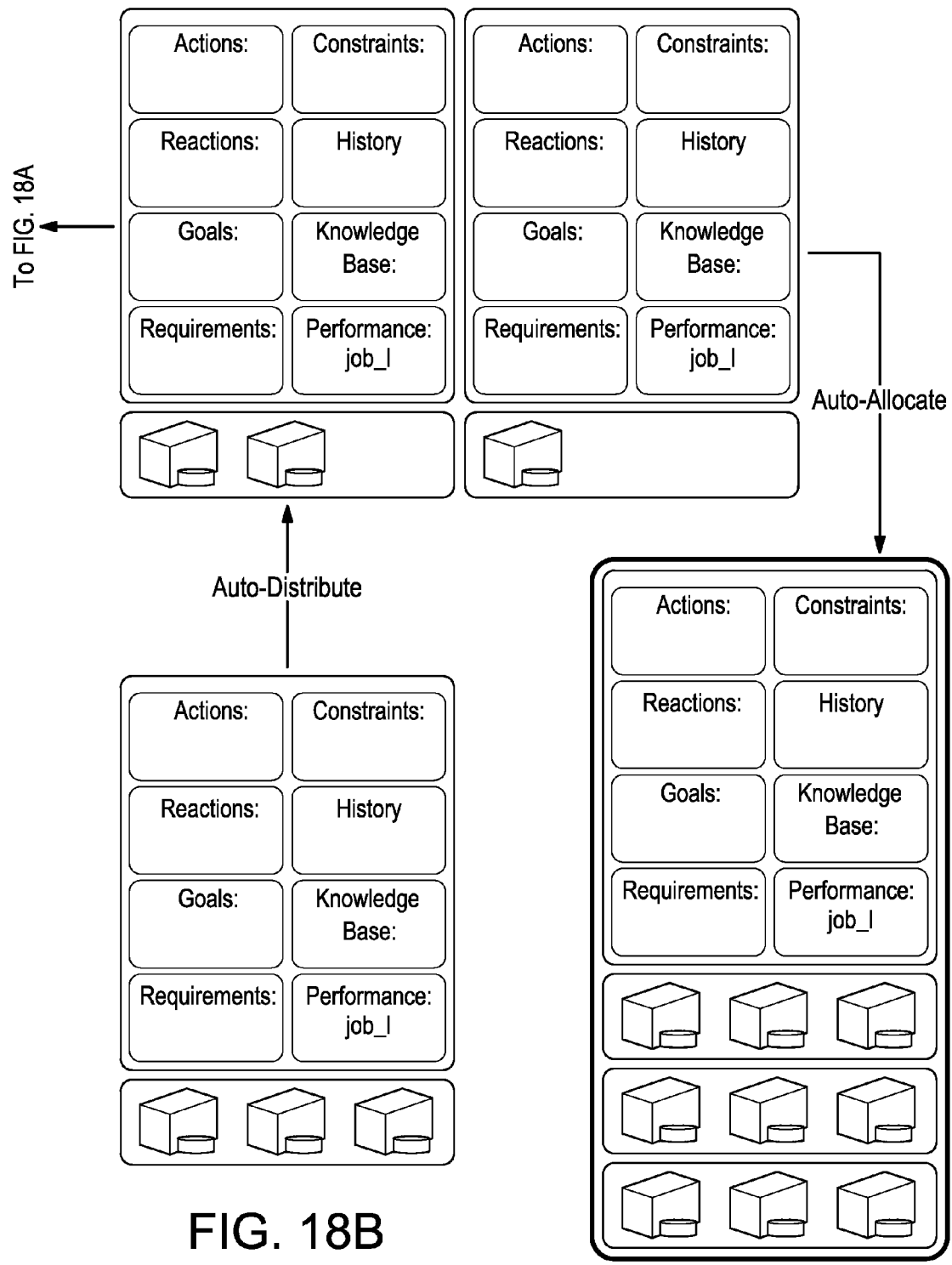

FIG. 17 is a series of GAANT chart representations of actions showing examples of auto-distribution of selected actions. In one example of Auto-Distribution, it increases the infrastructure cost but does not reduce the response time since the actions being distributed have dependencies and cannot be parallelized. In another example of Auto-Distribution, it increases the infrastructure cost and reduces the response time since actions without dependencies are distributed. In general, the system exploits experience and optimization to know when distribution, duplication, allocation, or replication can improve the overall system performance. Each architecture deployment instance identifies those tasks it is performing that can be easily parallelizable and those tasks that can accelerate the job if additional computational resources were used. The instance considers the investment in time and resources and potential return of spawning new computational resources. It further considers the priority (e.g., customer x has paid for higher level of service) of jobs when considering whether spawn new servers or not. FIG. 18 illustrates a system utilizing auto-distribute, -duplicate, -replicate and -allocate primitives in an evolving parallel system consistent with an embodiment of the present invention. This figure shows how each instance may, autonomously, further reallocate or rearrange hardware resources and software processes to meet its goals.

Figure 19:
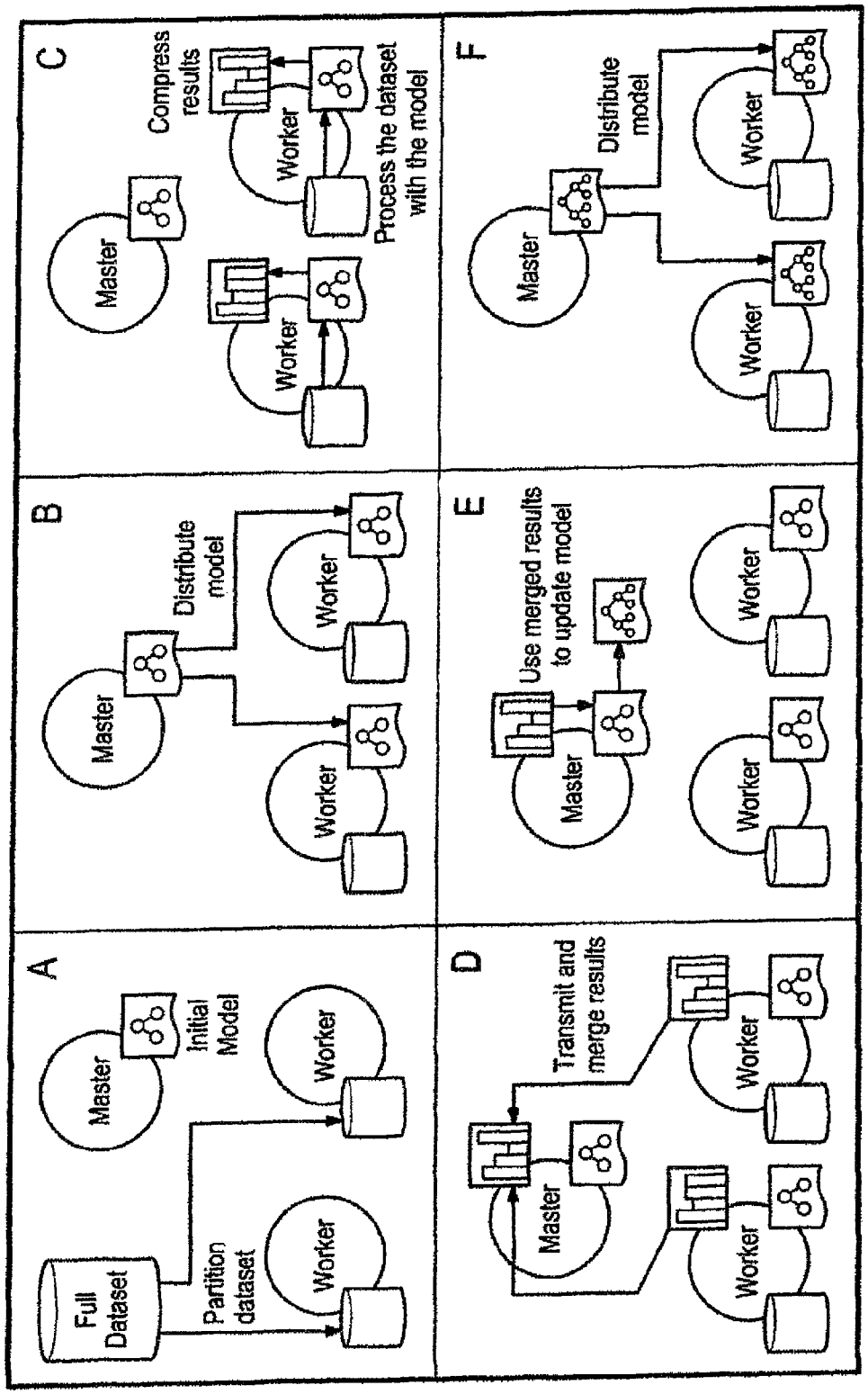
FIGS. 19A-19F are simplified conceptual diagrams that illustrate a method for building a decision tree in accordance with an aspect of the present disclosure.
Figure 20:
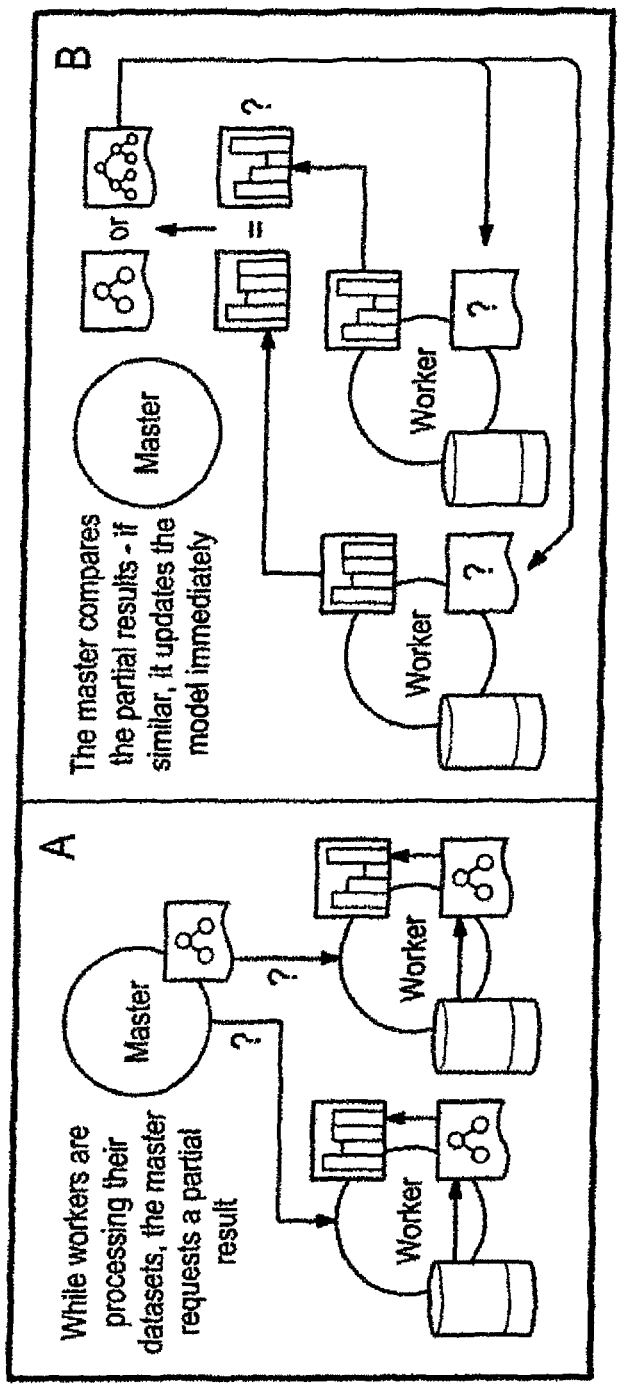
FIGS. 20A-20B are simplified conceptual diagrams that illustrate a method for processing partial results received from worker or child processes in order to speed the construction of a decision tree model in accordance with the present disclosure.

FIG. 19 comprises a series of six frames, labeled A though F sequentially. Each frame shows a simplified conceptual diagram of one step of a distributed process for building a decision tree model. These "steps" are not limited to a strict sequence. To the contrary, the model building preferably is parallelized and distributed, as further discussed below. It may operate asynchronously in various respects. For example, a worker process, further described below, may report partial or final results to its parent, which may be the master process, when the worker is ready. In FIG. 19A a full dataset of training data is partitioned into a plurality of partition datasets, only two of which are shown for illustration. Each partition dataset is delivered or made available to a respective worker process ("Worker"). A Worker process, like the illustrated Master process, refers to computer software executable on a processor to provide the functionality described.

Further, with regard to FIG. 19A, the master process creates or obtains access to an initial model, for example the root of a decision tree, which may be based on a subset of the full dataset, or the entire dataset. In FIG. 19B, the master process distributes the initial model to each of the worker processes. In FIG. 19C, each of the workers processes the data of its corresponding partition dataset through the distributed model to form local results. The local results may be gathered and expressed in the form of a histogram as illustrated, which serves to compress the local results. While only a single histogram per worker is shown for illustration, in practice the worker generates a separate histogram for each input variable.

In the case of categorical data, i.e. to construct classification trees, we apply the concept of approximate histograms in a new way. We extend the histogram so that it can also represent a relationship between a numeric field and a categorical field. Our expanded histogram is further described below.

Referring now to FIG. 19D, each worker transmits its compressed results—a series of histograms—to the master process, which in turn merges the results, which may be stored in a merged histogram 140. In a simple example, where the bins have the same median values, histograms can be merged by simply summing the counts. Importantly, the illustrated structure and process may be further distributed to additional levels of worker processes. At each level, a worker reports results only to its immediate parent node. Each parent node merges those results, and reports the merged histograms to the next level up, and so on.

Returning to our example, as illustrated in FIG. 19E, the master uses the merged results from its workers to update the model. In one embodiment, the model is updated by growing an additional layer of a decision tree. Then the master distributes the updated model to each of the workers, FIG. 19F. Each worker then processes its respective partition dataset once again, this time using the updated model. Results are gathered and reported. This process is repeated iteratively, growing the tree model, until a stop condition is met. In some embodiments, one model update is generated for every iteration over the data.

We prefer not to stop a model building process on reaching an arbitrary depth of the tree. Rather, we prefer to stop the process when a monetary budget constraint is met. A budget may be established in advance by a user (customer) for a given modeling project or dataset. The dollar cost of the request can be estimated by the current costs of CPU time and I/O bandwidth. CPU time and I/O bandwidth (and storage) are now fungible and can be obtained in a competitive cloud marketplace. We can also stop the process based on a running time limit, or based on performance of the model on a holdout set of data. The constraints as well can be established in advance by a user (customer) for a given modeling project or dataset.

FIG. 24 is a simple example of a graphical user interface display of a dataset. Here, the visual display lists the input fields, under the heading "Name", and for each field it shows the corresponding Type (ABC indicates a categorical field, and 123 signifies a numeric field), item Count, and numbers of instances Missing and Errors in analyzing the set. As indicated in the heading bar, the summary table can be sorted on any of these parameters, in ascending or descending order. The last (right) column labeled "Histogram" shows graphically, in bar graph style, a summary of the dataset, with regard to each input field. The class fields have only a few possible values (e.g., "male"-"female"), while the numeric fields are represented by a plurality of histogram bins, showing graphically the distribution of the data based on those variables. As discussed above, JSON messages can be used for efficiently transmitting these kinds of summary results. An example is shown in FIG. 27, discussed later.

Speedup Based on Partial Results

In a preferred embodiment, multiple model updates can be generated during a single pass of the data. Put another way, a small sample of the overall data is often sufficient to generate a good quality model update. Implementing an early model update can save substantial processing time. The question is, at what point is the partial results data sufficient to make a profitable split.

We have discovered that a useful indication, as to whether or not an early split should be done, can be obtained comparing the workers' respective results, for example their approximate histogram results, while they are still processing their partition datasets. Referring now to FIG. 20A, in one embodiment, the master process can request a partial result while the workers are processing their datasets. Each worker responds with partial results, preferably in the form of an approximate histogram, reflecting the data processed to that point using the current model. The master compares the partial results. If the partial results are similar, the master updates the current model and immediately sends it to the workers. (The meaning of "similar" is described shortly.) The workers then process their partition datasets over the updated model, and continue iteratively as described. If the master determines not to update the model early, processing can continue as described above, until a stop criterion is met.

Importantly, the nature of the "partial results" can vary, depending on how the model building is distributed. In one embodiment, the job can be divided by dividing the training data set, as described above. Each worker process is charged with processing only its partition dataset. That job, of course, can be distributed to children worker processes as further described below with regard to FIG. 21.

In another embodiment, the job can be divided by node (leaf). That is, each worker is responsible for building the histograms, and reporting results, only for one or more assigned nodes. In another embodiment, the model building job can be distributed by assigning to individual workers (and their progeny) the task of building an individual histogram, and reporting those results, for only one input variable. Whatever the arrangement, at each level, the corresponding "local master" process merges the results as appropriate and passes them up to the next level, for the root master to assess updating the model under construction.

In one embodiment, partial results may be assessed by a master process as follows. First, a split score is generated for the current histogram, before additional results are merged. A second split score is generated after merging the available or requested partial results into the histogram. If the merged result (second split score) is substantially the same as the prior result, it is a useful indication that the subject histogram is "stable" and does not require further updates.

In an embodiment, the method calls for using the merged histogram, finding a set of points that partition the histogram into bins each having the same number of data instances, and then applying that set of points to generate split scores for each histogram. We use these points to generate split scores for each histogram. And finally, we calculate the "earth mover distance" between the score sets, a known indicator of how different two histograms are. For the early model update procedure to be successful, the data should not be ordered. To ensure a random ordering, the original dataset preferably is shuffled before it is partitioned and sent to the workers. In a preferred embodiment, along with a mean and a count, each bin maintains a hash map of counts for each category or leaf, as further illustrated below.

As mentioned, we have expanded the use of histograms in new ways. In particular, our extended approximate histograms provide enhanced efficiency in reporting results from workers to master processes, and processing those results (which may be partial results) in connection with building a decision tree. Our goal is to capture and convey information that relates the input field to the objective field. The challenge is that some variables may be numeric while others are categorical. There are four types of field summaries to consider. The objective field can be either categorical (which means a classification problem) or numeric (which means a regression problem). The input field also may either be categorical or numeric. We address all four possible combinations. We describe our extended approximate histograms in the following example. Assume the following dataset:

| Sex, | Age, | Weight, | First Name |
|---|---|---|---|
| "M", | 23, | 178, | "John" |
| "F", | 16, | 102, | "Sue" |
| "M", | 36, | 168, | "Chris" |
| "F", | 44, | 192, | "Chris" |
| "M", | 83, | 131, | "John" |
| "M", | 71, | 235, | "Chris" |

The numeric fields summaries for "age" and "weight" can use known histograms. Their bins contain only a mean and a count as we're not trying to capture correlations between fields. The categorical fields, "sex" and "first name", can use a list of category counts as the summary. For the first example, let's say we want to predict "weight" using "age" as an input field. This means a numeric input field and a numeric objective field.

{
"name":"age",
"missing_count":0,
"summary":
 {"min":7,
  "max":82,
  "count":85,
  "histogram":[[19.5,2,280], [40.0,2,360], [77.0,2,366]]
 }
}

The histogram shows, for the input named "age," in each bin, the mean value of weight, number of counts, and the sum of the "weights" for the people in the bin. This is sufficient information to evaluate potential splits for better predicting "weight" given "age".

Next, the object is to predict "weight" using "sex" as an input field. This is an example of a categorical input with a numeric objective.

{
"name":"sex",
"missing_count":0,
"summary": {"categories": [["M" 4 712] ["F" 2 294]]}
}

The format is similar to the previous one, except now each bin contains a category (instead of a mean). Each bin still captures the count and the sum of the "weights". This gives us enough information to evaluate a split on "sex" in order to predict "weight".

Next, assume the goal is to predict "sex" given "weight". This is a numeric input field and a categorical objective field. This is the type of situation for which we devised extended histograms. In our extended histograms, in some embodiments, each bin may include a "map" of category counts (in this case, sex). These maps enable correlating how a numeric field (weight in this illustration) affects a categorical field (sex). Here is the example:

{
"name":"weight",
"missing_count":0,
"summary":
 {"min":102,
  "max":235,
  "sum":1006,
  "sum_squares":179562,
  "count":6,
  "histogram":[[19.5,2.0,{"F":1,"M":1}], [40.0,2.0,{"F":1,"M":1}], [77.0,2.0,{"M":2}]]
 }
}

Finally, the case of predicting "sex" given a "first name". This illustrates a categorical input field with a categorical objective field. In this case, in some embodiments, we maintain a "map of maps" for counting the occurrences of any of the possible combinations between those two categorical fields. Although we use a maps of maps (a sparse encoding of the occurrences), it could also be implemented with a matrix (a dense encoding of the occurrences).

{
"name":"first name",
"missing_count":0,
"summary": {"categories":  {"John":{"M":3}
                            "Sue":{"F":1}
                            "Chris":{"M":2,"F":1}}
}

Efficient Computation of Decision Trees Using a Scalable Network of Computers

The previously defined tree growing method works well for a small number of workers but can be problematic when scaling to many workers. The bandwidth to receive the histogram results and send model updates could overwhelm the master. Also, the master may not have the CPU resources required to merge the histogram results in an acceptable time frame.

To alleviate the pressure on the master, in one embodiment, a system may be used that comprises a tree structured network of computers to distribute the tasks. The master node preferably will only send models, send update requests, and receive histogram results from a small, predefined number of children workers. (For simplicity, the drawings show two children). Those workers (children) will only communicate with their parents and their own children. The depth of the tree may be determined by the desired total number of computers.

Figure 21:
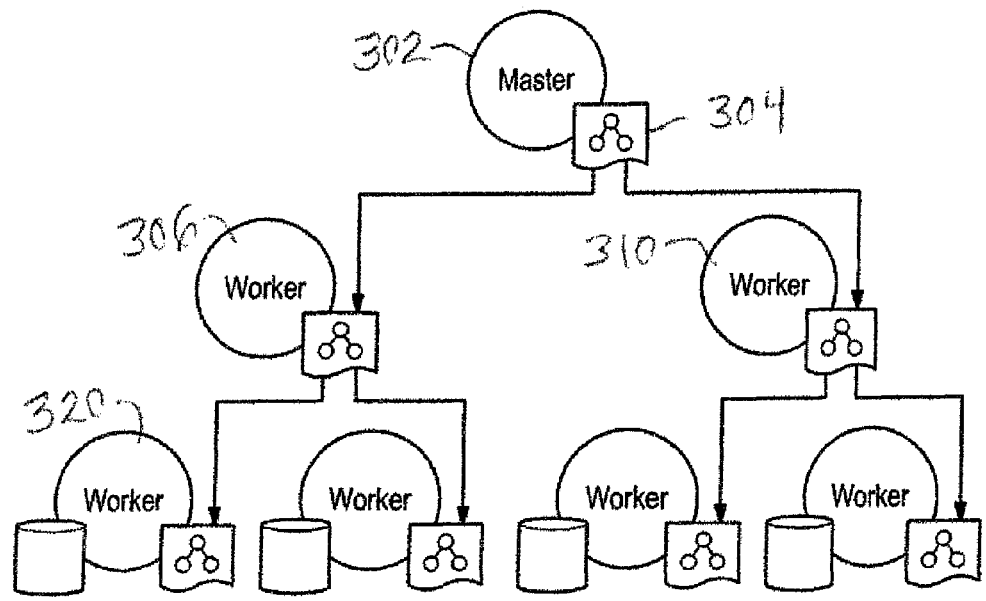
FIG. 21 is a simplified conceptual diagram that illustrates distribution of a decision tree model from a master node to a group of worker processes in a scalable, tree-structured network of processors, in accordance with the present disclosure.

FIG. 21 is a simplified conceptual diagram that illustrates distribution of a decision tree model from a master node to a group of worker processes in a scalable, tree-structured network of processors, in accordance with the present disclosure. In operation, as shown in the drawing, the master 302 distributes a model 304 to its workers 306, 310, and each worker in turn distributes the model to its child workers, for example 320. The concept is not limited to a binary tree. Nor is the concept limited to two levels, more may be employed. In this way, communication bandwidth requirements are limited. A request from the master for partial results can likewise be distributed down the tree, from each parent process to its respective children.

Figure 22:
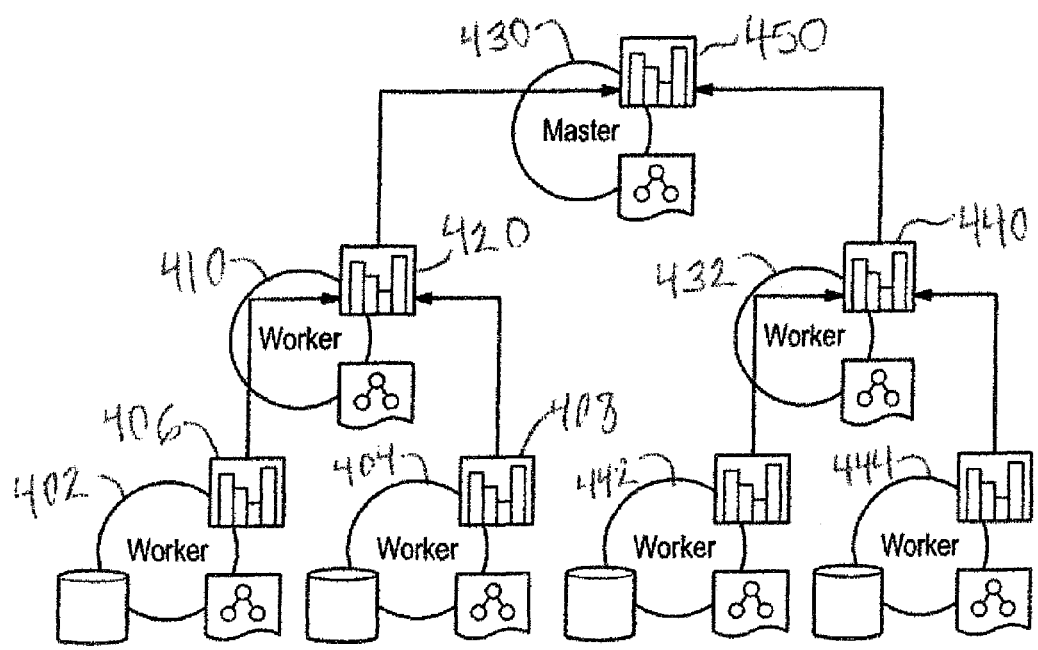
FIG. 22 is a simplified conceptual diagram illustrating a method for worker processes in a scalable, tree-structured network, to collect approximate histogram results from their immediate children worker processes, combine the histogram results, and send the combined histogram results to their respective immediate parent processes, in accordance with another aspect of the present disclosure.

In response to a request for partial results, each child process sends its results, for example in the form of a set of histograms, to its immediate parent process. In this discussion, we will sometimes refer to a histogram in the singular. It is understood that, in practice, many histograms will be processed as described, and "a histogram" may in fact refer to a related set of histograms, for example a set of histograms, one per input variable, at a given node. Referring now to FIG. 22, child workers 402, 404 each send their histogram results 406, 408 respectively, to their common parent, namely worker 410. Worker 410 combines its histogram 420 with the children histograms 406, 408 to update the combined histogram 420. Worker 410 then passes the updated histogram up to its parent, namely master 430. The same process occurs on the other side of the drawing, so that worker 432 sends a combined histogram 440 to the master 430. The histogram 440 includes combined results from workers 442 and 444. In general, as illustrated in FIG. 22, each parent process in the network combines its histogram results with those of its children, and then transmits only the combined results to its parent. The master merges the histograms it receives as described above to form a merged histogram 450. This network structure allows the tree model building to be scaled to any number of machines without overwhelming the master.

Fast Classifications for a GBRT

The methods defined above can be used to create a variety of predictive tree models. One useful model is the gradient boosted regression tree (or GBRT). GBRTs are collections of regression trees. To make a prediction with a GBRT, each of its trees are evaluated and their outputs summed together (prediction=tree 1 output+tree 2 output+ . . . +tree n output).

GBRTs can also be used for classification problems, where predictions are categories rather than numeric (such as apple, orange, or banana). To do this, a GBRT is built for each category. Their prediction outputs are a number from 0 to 1, representing their confidence that the example is a member of their class.

Grown on a large dataset, a GBRT may include many regression trees. A GBRT with 500 trees would be large but not uncommon. GBRTs used for classification will have a GBRT for each class. This means a set of GBRTs for classification can lead to an explosion of individual trees. For example, if we had a classification problem with 50 classes, each might have a GBRT with 500 trees giving us 25,000 trees overall.

Traditionally, when making predictions, the trees for each class are summed to determine which class has the largest score (and therefore the best answer). This requires evaluating each tree, which as shown in our previous example, may take a significant amount of computation time. Another aspect of the present invention includes a novel way to minimize the time necessary to make classifications.

Figure 23:
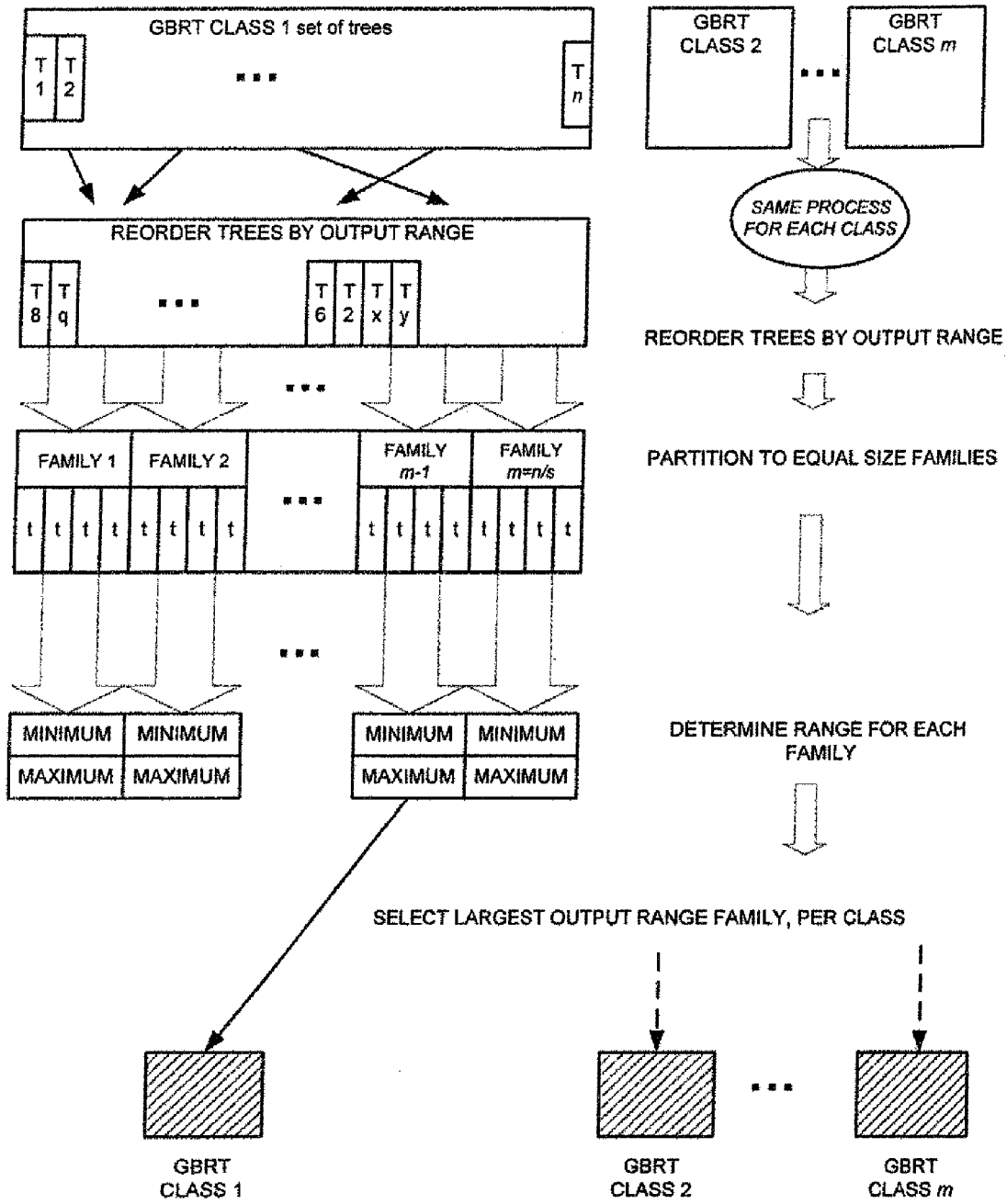
FIG. 23 is a simplified conceptual flow diagram illustrating a method for initializing or characterizing a group of classification GBRTs to support rapid predictions using the GBRTs in accordance with another aspect of the present disclosure.

FIG. 23 is a simplified conceptual flow diagram illustrating one example of a method for initializing or characterizing a group of classification GBRTs to support rapid predictions using the GBRTs in accordance with another aspect of the present disclosure. To initialize the system for predictions, we do the following once for classification GBRTs.

Referring to FIG. 23, in one embodiment, the method comprises, for each class's GBRT:

Order the GBRT's trees by their output range (the difference of their maximum and minimum outputs). If the trees are individually weighted, multiply the outputs by the corresponding weight.

Divide the trees into n equally sized families. The first family will contain the trees with the largest output range, the last family will contain the trees with the smallest output range.

Calculate the maximum and minimum output range for each family by summing the maximum and minimum outputs of each tree, respectively.

Figure 25:
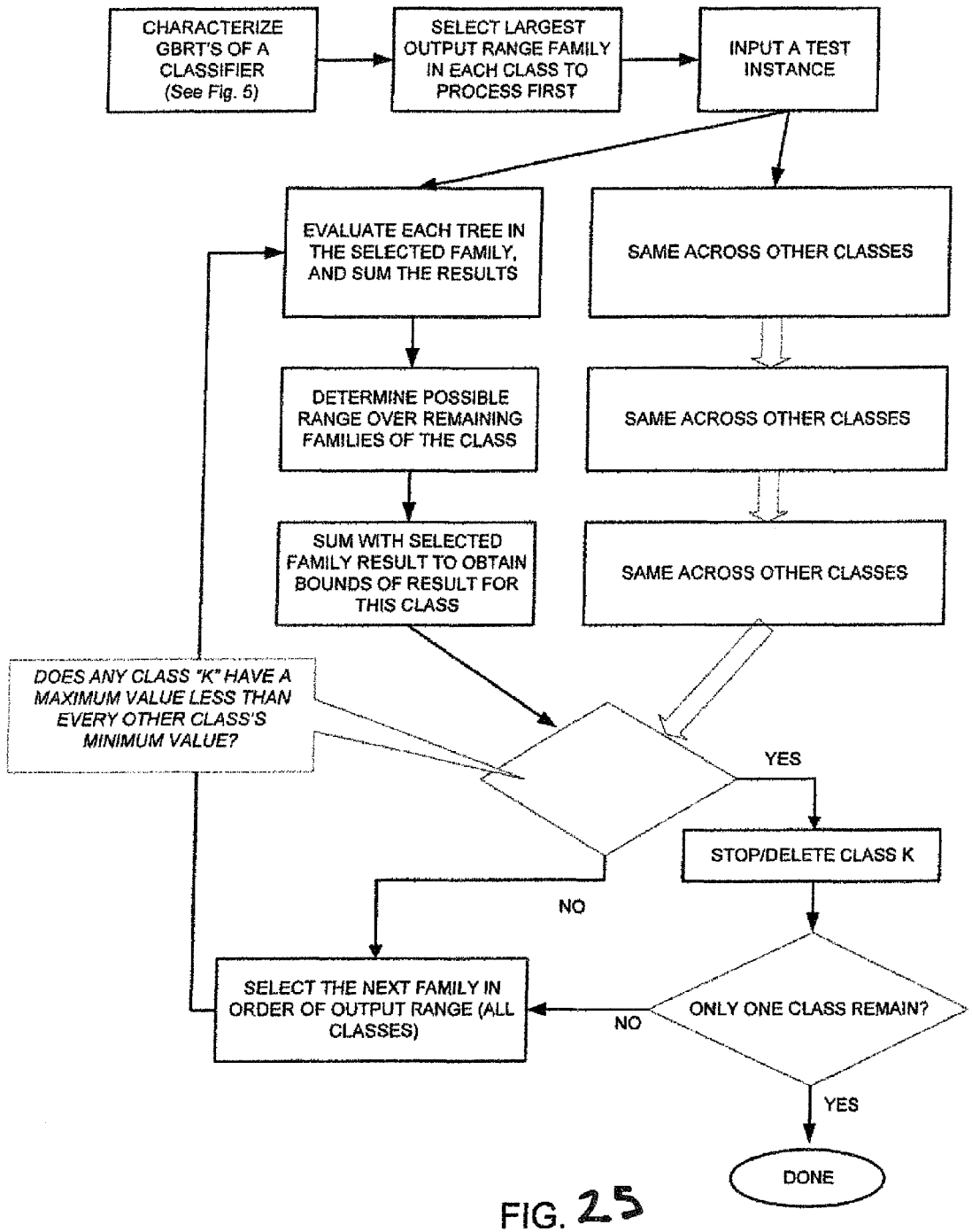
FIG. 25 is a simplified flow diagram illustrating a fast method for classifying a test instance using GBRTs in accordance with the present disclosure.

Now that we have maximum and minimum values for each class's tree families, our system in a preferred embodiment can use this data for fast predictions. FIG. 25 is a simplified flow diagram illustrating a fast method for classifying a test instance using GBRTs in accordance another aspect of the present disclosure. The method may proceed generally as follows.

For each class, evaluate and sum the trees in the largest tree family (the family with the largest output range).

Using the values from the previous step, find the possible range for each class by summing the maximum and minimum values of the remaining families, respectively.

Delete any class whose maximum range is less than any other class's minimum range.

Repeat the previous three steps until only one class remains.

This method reduces unneeded tree evaluations and speeds up the prediction process.

A Compact JSON Format for Representing Trees

Our system in one embodiment uses a JSON format to represent our tree models and the results messages that are communicated between the worker nodes and the master. This JSON format allows our models to be much more compact than the equivalent model in the standard PMML format. FIG. 26 is an example of a decision tree model expressed in a compact JSON format.

FIG. 27 shows a simple example of a prediction results summary, expressed in a JSON format. This format is useful for summarizing and visualizing datasets. Here, we see for each variable or input field, age, sex and weight, a summary of the corresponding prediction results. For the input variable named age, this is a numeric field, and the results include a numeric summary (min, max, etc.). The code shows a histogram for this variable (age): "histogram":[[12.2,12.5],[18.8, 10.2],[28.2,15.7],[43,18.1],[58,15.8],[72,10.6]]. The reader can observe the histogram has six bins, each bin described by a corresponding pair {median, count}. As illustrated, the counts need not always be integers. For the variable sex, there are only two categories, and the results for each are shown. The counts total only 80 for this variable, because 20 other instances are variously indicated as null, na or missing, out of the overall 100 input instances. Finally, the third variable named weight is also summarized. Here, the entire 100 samples are accounted for (count=100), and the numeric summary is shown. In this case, the weight variable results are summarized (or compressed) into a histogram having six bins.

Figures 28C, 28D:
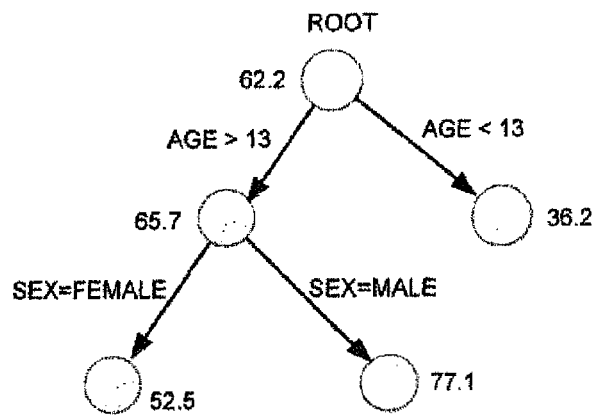
FIG. 28C is a continuation of FIG. 28A.
FIG. 28D shows the decision tree diagram of FIG. 28B augmented to reflect the additional layer expressed in the code of FIG. 28C.

FIG. 28A is a simple example of a decision tree model expressed in a compact JSON format. FIG. 28B is a decision tree diagram corresponding to the code of FIG. 28A. FIG. 28C is a continuation of FIG. 28A. FIG. 28D shows the decision tree diagram of FIG. 28B, augmented to reflect the additional layer expressed in the code of FIG. 28C.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method of processing tree models corresponding to user data of plural users, the method comprising the steps of:

deploying a first architecture deployment instance, the first architecture deployment instance storing a respective tree model processing budget for each one of plural users against which tree model processing costs for the corresponding user are applied, providing a user interface process with which each user uploads its user data, providing a data analysis process to analyze each user's data and convert it into a corresponding dataset, and providing a model builder process to construct a corresponding decision tree model based on the dataset of each user, the first architecture deployment instance employing first computing resources;

wherein providing the model builder process includes for a selected dataset, (a) distributing plural partitions of the selected dataset from a master process to plural respective worker processes; (b) until a predetermined tree model building criterion is met by a finished first tree model, distributing a first tree model of the selected dataset from the master process to the plural worker processes; (c) processing the respective partition of the selected dataset at each worker process with the first tree model to obtain a local tree model result; and (d) updating the first tree model at the master process according to one or more of the local tree model results and returning to step (b), in an iterative fashion, wherein updating the first tree model comprises growing an additional layer of the tree model in each iteration; and wherein updating the first tree model at the master process according to one or more of the local tree model results includes, at each worker process, compressing its local results into a series of histograms, one histogram for each input variable of the dataset, and transmitting the histograms to the master process.

2. The method of claim 1 having a first computing performance with a corresponding first cost for processing the user data of each user and wherein the method further comprises selectively activating second computing resources with an associated second cost to improve upon the first computing performance in processing the user data of a selected user if the second cost conforms to the tree model processing budget of the selected user.

3. The method of claim 2 wherein selectively activating second computing resources further includes identifying steps the first architecture deployment instance is performing that can improve upon the first computing performance with activation of second computing resources parallel to the first computing resources.

4. The method of claim 2 wherein actions are being performed and are to be performed by the first architecture deployment instance, the method further comprising:
  partitioning the pending actions into first and second sets;
  spawning a second architecture deployment instance that includes providing a user interface process with which each user uploads user data, providing a data analysis process to analyze the user data and convert it into a dataset, and providing a model builder process to construct a tree model based on the dataset of each user, the second architecture deployment instance employing second computing resources different from the first computing resources; and
  selectively distributing one of the first and second sets of pending actions to the second architecture deployment instance for processing.

5. The method of claim 1 further comprising selective activation by a user of a prediction process in the first architecture deployment instance to provide a prediction based on the finished first tree model.

6. The method of claim 1 wherein at least one updating of the first tree model is responsive to local tree model results from fewer than all of the worker processes.

7. The method of claim 6 wherein the local tree model results from fewer than all of the worker processes are partial local tree model results and the method further comprises making a comparison of the partial local tree model results and updating the first tree model at the master process whenever the comparison meets a predetermined partial local tree model result criterion.

8. The method of claim 6 wherein the at least one updating of the first tree model is made while at least one worker process is still processing its local tree model result.

9. The method of claim 6 wherein the at least one updating of the first tree model is a result of a request for partial local tree model results from the master process.

10. The method of claim 1 wherein updating the first tree model at the master process includes merging together the histograms received from the worker processes.

11. The method of claim 1 wherein the tree model building criterion comprises a monetary budget constraint.

12. The method of claim 1 wherein the tree model building criterion comprises performance of the model on a holdout set of data.

13. The method of claim 1 including, at the master process, requesting partial results from the worker processes while they are still processing their respective partitions of the selected dataset, and receiving partial results from the worker processes in the form of approximate histograms reflecting the data processed to that point by the corresponding worker process using the current updated model.

14. The method of claim 13 including shuffling the input dataset before it is partitioned and sent to the worker processes so that the data will not be ordered.

15. The method of claim 13 wherein the dataset combines a numeric input field with a categorical objective field, and the method includes summarizing at least a portion of the data in an extended histogram in which each bin includes a map of category counts to enable correlating how the numeric field affects the categorical field.

16. The method of claim 13 wherein the dataset combines a categorical input field with a categorical objective field, and the method includes maintaining a map of maps for counting the occurrences of any of the possible combinations between those two categorical fields.

17. The method of claim 13 including, at the master process, assessing the partial results to determine whether to update the model before the worker processes finish processing their respective partitions of the selected dataset, to reduce processing time to complete building the model.

18. The method of claim 17 wherein assessing the partial results includes:
  generating a first split score for a current histogram, before additional results are merged;
  merging the partial results into the current histogram to form a merged histogram;
  generating a second split score for the merged histogram; and
  comparing the second split score to the first split score to assess whether the subject histogram is stable.

19. The method of claim 18 further comprising, if the subject histogram is stable, updating the model before the worker processes finish processing their respective partitions of the selected dataset, to reduce processing time to complete building the model.

20. A computer-implemented method of processing tree models corresponding to user data of plural users, the method comprising the steps of:

deploying a first architecture deployment instance, the first architecture deployment instance storing a respective tree model processing budget for each one of plural users against which tree model processing costs for the corresponding user are applied, providing a user interface process with which each user uploads its user data, providing a data analysis process to analyze each user's data and convert it into a corresponding dataset, and providing a model builder process to construct a corresponding decision tree model based on the dataset of each user, the first architecture deployment instance employing first computing resources;

wherein providing the model builder process includes for a selected dataset, (a) distributing plural partitions of the selected dataset from a master process to plural respective worker processes; (b) until a predetermined tree model building criterion is met by a finished first tree model, distributing a first tree model of the selected dataset from the master process to the plural worker processes; (c) processing the respective partition of the selected dataset at each worker process with the first tree model to obtain a local tree model result; and (d) updating the first tree model at the master process according to one or more of the local tree model results and returning to step (b);

having a first computing performance with a corresponding first cost for processing the user data of each user and wherein the method further comprises selectively activating second computing resources with an associated second cost to improve upon the first computing performance in processing the user data of a selected user if the second cost conforms to the tree model processing budget of the selected user;

wherein selectively activating second computing resources further includes identifying steps the first architecture deployment instance is performing that can improve upon the first computing performance with activation of second computing resources parallel to the first computing resources; and wherein activation of second computing resources parallel to the first computing resources includes activating one of an Auto-Replicate primitive, an Auto-Distribute primitive, an Auto-Duplicate primitive, and an Auto-Allocate primitive for variously scaling the second computing resources.

* * * * *